(12) United States Patent
No et al.

(10) Patent No.: US 10,075,222 B2
(45) Date of Patent: Sep. 11, 2018

(54) APPARATUS AND METHOD FOR INTERFERENCE ALIGNMENT IN WIRELESS COMMUNICATION SYSTEM

(71) Applicants: Samsung Electronics Co., Ltd., Gyeonggi-do (KR); Seoul National University R & DB Foundation, Seoul (KR)

(72) Inventors: Jong-Seon No, Seoul (KR); Ho-Youn Kim, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/482,495

(22) Filed: Apr. 7, 2017

(65) Prior Publication Data

US 2017/0294948 A1 Oct. 12, 2017

(30) Foreign Application Priority Data

Apr. 7, 2016 (KR) .......................... 10-2016-0042767

(51) Int. Cl.
*H04W 72/00* (2009.01)
*H04B 7/06* (2006.01)
(Continued)

(52) U.S. Cl.
CPC ........... *H04B 7/0617* (2013.01); *H04B 7/024* (2013.01); *H04B 7/026* (2013.01); *H04B 7/0408* (2013.01);
(Continued)

(58) Field of Classification Search
CPC .... H04B 7/0617; H04B 7/0452; H04B 7/024; H04B 7/026; H04B 7/0408; H04W 72/1226; H04W 72/046
See application file for complete search history.

(56) References Cited

U.S. PATENT DOCUMENTS 9,854,589 B2 * 12/2017 Nayeb Nazar ...... H04W 72/082
2007/0135172 A1 * 6/2007 Lysejko ................ H04W 16/28
455/562.1
(Continued)

FOREIGN PATENT DOCUMENTS

KR 20140100258 A 8/2014

*Primary Examiner* — Ajit Patel

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An operation method of a reception node in a wireless communication system includes: receiving first signals including a signal received through a first channel, which is a channel between at least one transmission node belonging to a cell of the reception node and the reception node, and a signal received through a second channel, which is a channel between at least one transmission node belonging to a neighbor cell and the reception node during a first time interval; receiving a second signal, to which beamforming for removing a signal from at least one transmission node belonging to the neighbor cell is applied, from a relay station through a channel between the relay station and the reception node; and decoding a third signal acquired by adding the first signal and the second signal.

20 Claims, 15 Drawing Sheets

(51) Int. Cl.
*H04W 72/12* (2009.01)
*H04B 7/0408* (2017.01)
*H04B 7/026* (2017.01)
*H04W 72/04* (2009.01)
*H04B 7/024* (2017.01)
*H04B 7/0452* (2017.01)

(52) U.S. Cl.
CPC ........ *H04B 7/0452* (2013.01); *H04W 72/046* (2013.01); *H04W 72/1226* (2013.01)

(56) References Cited

U.S. PATENT DOCUMENTS

| | | | |
|---|---|---|---|
| 2010/0067427 A1* | 3/2010 | Choudhury | H04B 7/15542 370/315 |
| 2012/0202540 A1* | 8/2012 | Lee | H04W 72/082 455/501 |
| 2013/0053077 A1* | 2/2013 | Barbieri | H04B 7/0626 455/509 |
| 2013/0237210 A1* | 9/2013 | Kang | H04W 72/0426 455/422.1 |
| 2016/0094285 A1* | 3/2016 | Ayoughi | H04W 16/28 370/317 |
| 2017/0257155 A1* | 9/2017 | Liang | H04B 7/0617 |

* cited by examiner

APPARATUS AND METHOD FOR INTERFERENCE ALIGNMENT IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) to Korean Application Serial No. 10-2016-0042767, which was filed in the Korean Intellectual Property Office on Apr. 7, 2016, the entire content of which is hereby incorporated by reference.

TECHNICAL FIELD

The present disclosure relates to a wireless communication system and, more particularly, to an apparatus and a method for interference alignment.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The wireless communication system may use an interference alignment scheme to mitigate interference. When there is a plurality of interference sources in the surroundings, the interference alignment scheme may allow a desired signal to be received and an interference signal to use different transmission spaces provided by multiple transmission/reception antennas, thereby aligning interference in the remaining spaces except for the space occupied by the desired signal.

The largest problem in applying the interference alignment scheme to a cellular environment is processing complexity. In general, a mobile device (for example, a terminal) may have a relatively low information processing capability. Accordingly, making a request for channel information of the entire network for interference alignment beamforming and processing the channel information by the mobile device may cause problems such as an overload of the mobile device.

SUMMARY

To address the above-discussed deficiencies, it is a primary object to provide an embodiment of the present disclosure provides an apparatus and a method for interference alignment in a wireless communication system.

Another embodiment of the present disclosure provides an apparatus and a method for interference alignment using a half-duplex relay station in a wireless communication system.

Still another embodiment of the present disclosure provides an apparatus and a method for achieving interference alignment while reducing an overload of data required by a transmission node.

In accordance with an aspect of the present disclosure, an operation method of a reception node in a wireless communication system is provided. The operation method includes: receiving first signals including a signal received through a first channel, which is a channel between at least one transmission node belonging to a cell of the reception node and the reception node, and a signal received through a second channel, which is a channel between at least one transmission node belonging to a neighbor cell and the reception node during a first time interval; receiving a second signal, to which beamforming for removing a signal from at least one transmission node belonging to the neighbor cell is applied, from a relay station through a channel between the relay station and the reception node during a second time interval; and decoding a third signal acquired by adding the first signal and the second signal.

In accordance with another aspect of the present disclosure, an operation method of a relay station in a wireless communication system is provided. The operation method includes: receiving first signals including a signal received through a first channel, which is a channel between at least one transmission node belonging to a cell of a reception node and the relay station, and a signal received through a second channel, which is a channel between at least one transmission node belonging to a neighbor cell and the relay station, during a first time interval; and transmitting a second signal, to which beamforming for removing a signal from at least one transmission node belonging to the neighbor cell received by the reception node is applied, to the reception node through a channel between the relay station and the reception node during a second time interval.

In accordance with another aspect of the present disclosure, an apparatus of a reception node in a wireless communication system is provided. The apparatus includes: a transceiver configured to receive first signals including a signal received through a first channel, which is a channel between at least one transmission node belonging to a cell of the reception node and the reception node, and a signal received through a second channel, which is a channel between at least one transmission node belonging to a neighbor cell and the reception node during a first time interval and to receive a second signal, to which beamforming for removing a signal from at least one transmission node belonging to the neighbor cell is applied, from a relay station through a channel between the relay station and the reception node; and a controller configured to decode a third signal acquired by adding the first signal and the second signal.

In accordance with another aspect of the present disclosure, an apparatus of a relay station in a wireless communication system is provided. The apparatus includes: a transceiver configured to receive first signals including a signal received through a first channel, which is a channel between at least one transmission node belonging to a cell of a reception node and the relay station, and a signal received through a second channel, which is a channel between at least one transmission node belonging to a neighbor cell and the relay station, during a first time interval and to transmit a second signal, to which beamforming for removing a signal from at least one transmission node belonging to the neighbor cell received by the reception node is applied, to the reception node through a channel between the relay station and the reception node during a second time interval.

The present disclosure may provide an apparatus and a method for interference alignment suitable for real time communication by removing an amount of required symbol extension while removing requirements for channel information of a transmission node and beamforming requirement conditions in a mobile terminal of a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the operational principle of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

Hereinafter, the present disclosure will describe a technology for interference alignment in a wireless communication system.

The term referring to channel information used in the following description, the term referring to network entities, and the term referring to an element of the device are employed for convenience of description. Accordingly, the present disclosure is not limited to the following terms and other terms having the same technical meaning may be used.

For convenience of the description, the present disclosure uses terms and names defined in the 3rd Generation Partnership Project Long Term Evolution (3GPP LTE). However, the present disclosure is not limited to the terms and names and may be equally applied to a system according to another standard.

Figure 1:
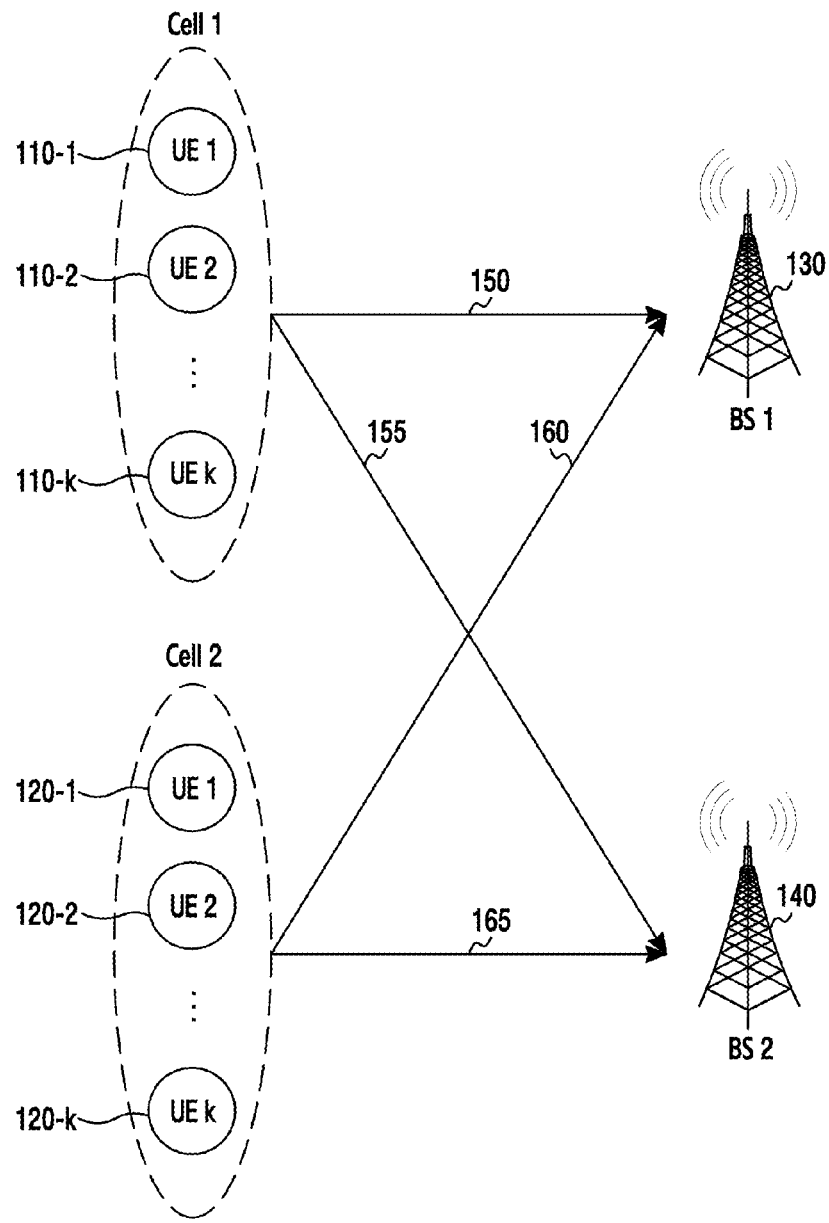
FIG. 1 illustrates an example uplink communication in a wireless communication system according to an embodiment of the present disclosure.
Figure 2:
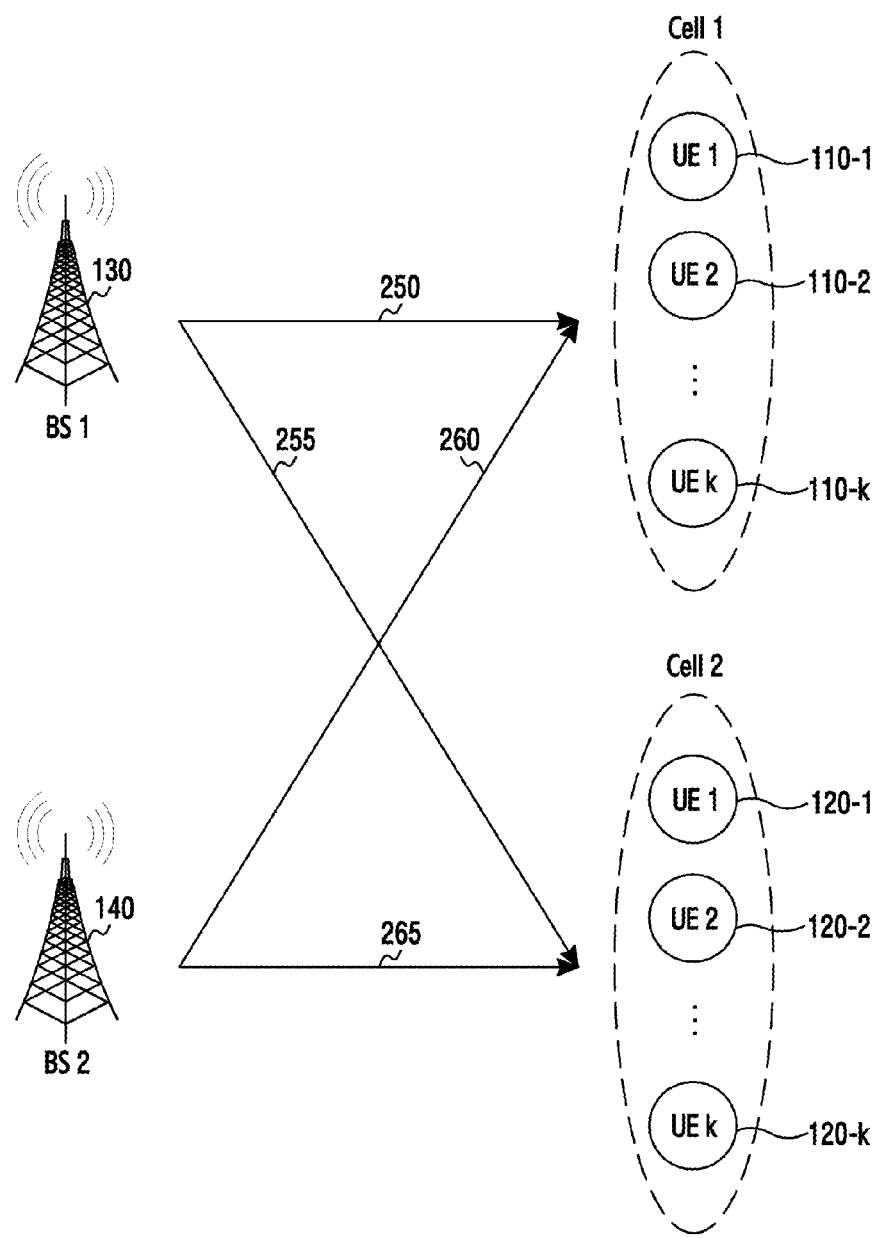
FIG. 2 illustrates an example downlink communication in a wireless communication system according to an embodiment of the present disclosure.

A multi-cellular environment is divided in an uplink communication process and a downlink communication process. The uplink communication and the downlink communication may be modeled by an interfering multiple access channel (IMAC) and an interfering broadcast channel (IBC), respectively. In the IMAC, a multiple access channel (MAC) corresponds to an environment in which there is a plurality of transmitters in one group and there is one receiver corresponding to one group. The IMAC refers to a channel in which there is interference that a transmitter group gives to a receiver in another group as illustrated in FIG. 1. Contrary to the MAC, the broadcast channel (BC) corresponds to an environment in which there is one transmitter and a plurality of receivers corresponding to one transmitter. The IBC is a channel in which there is interference that each transmitter gives to another receiver group as illustrated in FIG. 2.

Interference generated in each communication step may be largely divided into two interferences. The first interference refers to inter-cell interference that a transmitter gives to a receiver in another cell in uplink/downlink communication. The second interference refers to intra-cell interference between each transmitter group and each receiver group in uplink/downlink communication.

FIG. 1 illustrates an example uplink communication in a wireless communication system according to an embodiment of the present disclosure. Specifically, FIG. 1 illustrates an environment where a plurality of transmitters belong to one group and there is one receiver corresponding to one group, which corresponds to a channel, that is, an IMAC having interference that a transmitter group gives to a receiver in another group.

The wireless communication system illustrated in FIG. 1 includes terminals or user equipments (UEs) 110-1 to 110-$k$ located in a first cell, terminals 120-1 to 120-$k$ located in a second cell, a first base station (BS) 130 that provides wireless communication to a coverage area corresponding to the first cell, and a second BS 140 that provides wireless communication to a coverage area corresponding to the second cell.

In uplink communication of FIG. 1, a plurality of terminals located in each of the first cell and the second cell form a transmitter group and the BS corresponding to each cell is a receiver. The terminals 110-1 to 110-$k$ belonging to the group of the first cell transmit uplink signals to the first BS 130 through an uplink channel 150, and the terminals 120-1 to 120-$k$ belonging to the group of the second cell transmit uplink signals to the second BS 140 through an uplink channel 165. Meanwhile, the signals transmitted by the terminals 110-1 to 110-$k$ belonging to the group of the first cell may be transmitted to the second BS 140 through an uplink channel 155 and become interference to the second BS 140, that is, inter-cell interference. Similarly, the uplink signals transmitted by the terminals 120-1 to 120-$k$ belonging to the group of the second cell may be transmitted to the first BS 130 through an uplink channel 160 and become interference to the first BS 130, that is, inter-cell interference.

Further, the signals transmitted by the terminals belonging to the same cell may be interference to other terminals belonging to the same cell in the first BS 130 or the second BS 140, that is, intra-cell interference.

FIG. 2 illustrates an example downlink communication in a wireless communication system according to an embodiment of the present disclosure. Specifically, contrary to the IMAC of FIG. 1, FIG. 2 illustrates an environment where there are a plurality of transmitters and a plurality of receiver groups corresponding to each transmitter. The IBC is a channel in which there is interference that each transmitter gives to another receiver group as illustrated in FIG. 2.

The wireless communication system illustrated in FIG. 2 includes terminals 110-1 to 110-$k$ located in a first cell, terminals 120-1 to 120-$k$ located in a second cell, a first BS 130 that provides wireless communication to a coverage area corresponding to the first cell, and a second BS 140 that provides wireless communication to a coverage area corresponding to the second cell.

In downlink communication of FIG. 2, a plurality of terminals located in each of the first cell and the second cell form a receiver group and the BS corresponding to each cell becomes a transmitter. The first BS 130 transmits a downlink signal to each of the terminals 110-1 to 110-$k$ belonging to the group of the first cell through a downlink channel 250, and the second BS 140 transmits a downlink signal to each of the terminals 120-1 to 120-$k$ belonging to the group of the second cell through a downlink channel 265. Meanwhile, the signal transmitted by the second BS 140 to each of the terminals 110-1 to 110-$k$ belonging to the group of the first cell through a downlink channel 260 may be interference to the terminals 110-1 to 110-$k$ belonging to the group of the first cell by the second BS 140, that is, inter-cell interference. Similarly, the downlink signal transmitted by the first BS 130 to the terminals 120-1 to 120-$k$ belonging to the group of the second cell through a downlink channel 255 may be interference to the terminals 120-1 to 120-$k$ belonging to the group of the second cell by the first BS 130, that is, inter-cell interference.

Further, each of the terminals belonging to the same cell may receive a signal for another terminal belonging to the same cell from the first BS 130, and the signal for the other terminal belonging to the same cell may be interference and, more specifically, intra-cell interference.

Figure 3:
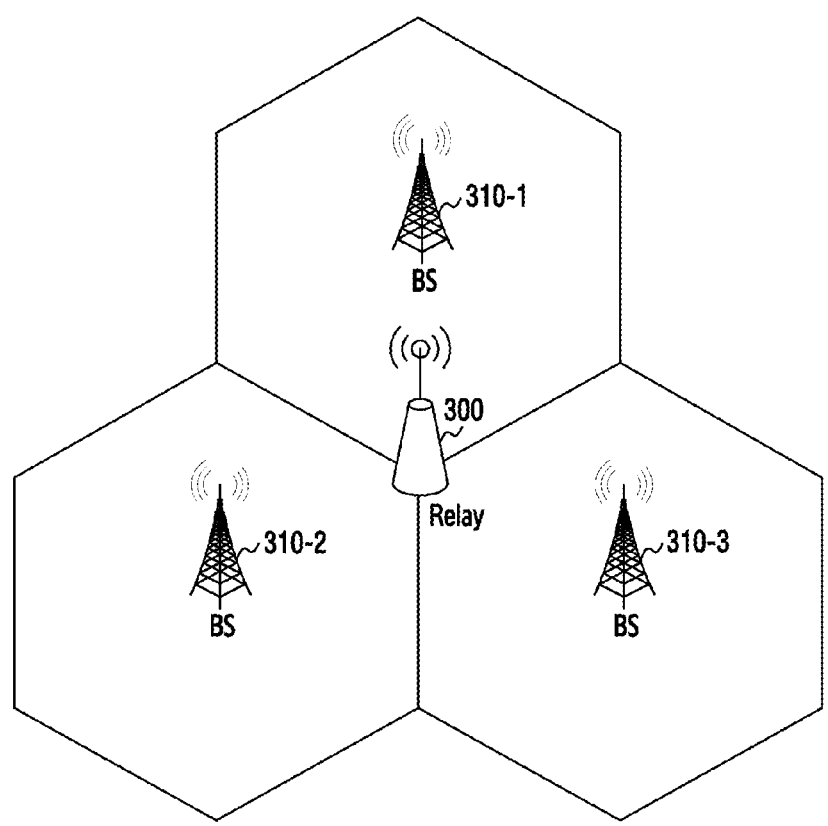
FIG. 3 illustrates an example 3-cell cellular environment including a relay station according to an embodiment of the present disclosure.

FIG. 3 illustrates an example 3-cell cellular environment including a relay station according to an embodiment of the present disclosure. The wireless communication system of FIG. 3 may include a plurality of BSs 310-1 to 310-3 and a Relay Station (RS) 300, and may further include an entity of another network although not illustrated.

A 3-cell cluster corresponds to a set of 3 adjacent cells. FIG. 3 illustrates a scheme in which one relay station 300 assists in interference alignment of the 3 cells. The example in FIG. 3 corresponds to a topological structure in which power can be uniformly distributed to all regions assisted by the relay station 300 in a generally assumed hexagonal cell structure.

The relay station 300 is a device that relays a signal between the BS and the terminal and may be used for expanding cell coverage of the wireless communication system and improving throughput. According to some embodiments, the relay station 300 may perform an Amplify and Forward (AF) function or a Decode and Forward (DF) function. Specifically, the relay station 300 may perform not only the amplify/forward function but also a signal processing operation such as a received signal decoding and beamforming as necessary. Further, the relay station 300 may perform multi-hop communication through the relay between a plurality of relay stations. According to another embodiment, the relay station 300 may exchange or process channel information through cooperation with the BS, and may perform beamforming based on channel information through cooperation with the BS.

Relay modes of the relay station may be divided into a full-duplex mode and a half-duplex mode. The full-duplex mode corresponds to a relay mode in which the relay station performs transmission and reception in the same time section, and the half-duplex mode corresponds to a relay mode in which transmission and reception are performed in different time sections. The full-duplex mode has a realistic implementation problem, such as a relay echo, in that a transmission signal of the relay station is input as a reception signal of another relay station. Further, in an interference alignment using the full-duplex relay, even though the relay station is used, a mobile device still requires simplified beamforming and symbol extension linearly increases in proportion to the number of increasing transmitters, so that there may be difficulty in real time communication. In addition, since a change in a channel state should not be made during a symbol extension time, a very long coherence time within the communication channel is needed. The need for a very long coherence time may cause difficulty in realistic implementation in a cellular environment where the user can move.

Figure 4:
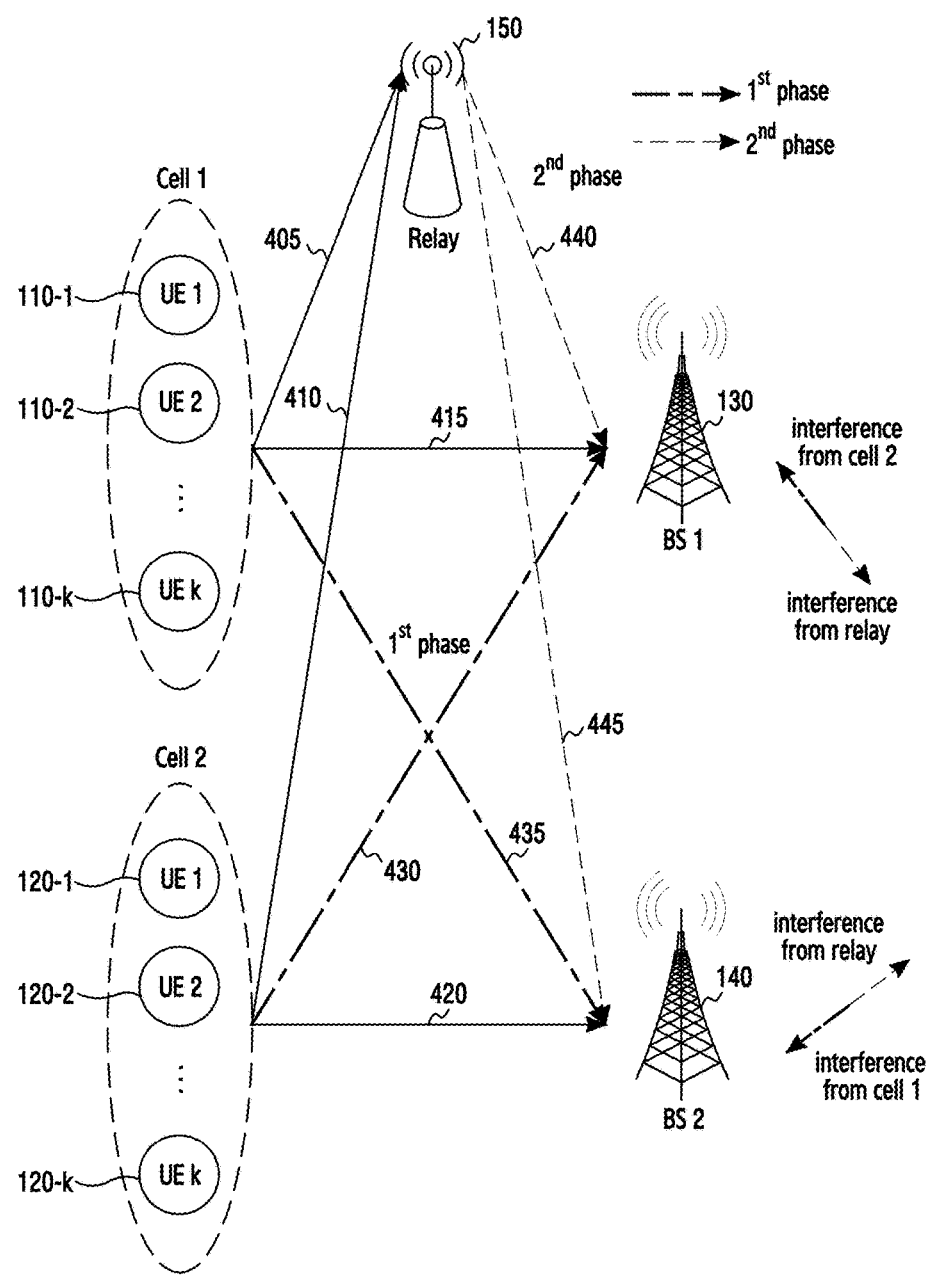
FIG. 4 illustrates an example uplink communication in a wireless communication system to which interference alignment using a half-duplex relay is applied according to an embodiment of the present disclosure.

FIG. 4 illustrates an example uplink communication in a wireless communication system to which interference alignment using a half-duplex relay station is applied according to an embodiment of the present disclosure. The wireless communication system illustrated in FIG. 4 includes terminals or UEs 110-1 to 110-$k$ located in a first cell, terminals 120-1 to 120-$k$ located in a second cell, a first BS 130 that provides wireless communication to a coverage area corresponding to the first cell, a second BS 140 that provides wireless communication to a coverage area corresponding to the second cell, and a relay station 150 that acts as a relay between the terminal and the BS.

In uplink communication, transmission nodes correspond to the terminals 110-1 to 110-$k$ in the first cell and the terminals 120-1 to 120-$k$ in the second cell, and reception nodes correspond to the first BS 130 and the second BS 140.

In uplink communication, signals transmitted by the terminals 110-1 to 110-$k$ of the first cell are received by the first BS 130, the relay station 150, and the second BS 140 through a channel 415 between the first cell and the first BS 130, a channel 405 between the first cell and the relay station 150, and a channel 435 between the first cell and the second BS 140, respectively. Further, signals transmitted by the terminals 120-1 to 120-$k$ of the second cell are received by the first BS 130, the relay station 150, and the second BS 140 through a channel 430 between the second cell and the first BS 130, a channel 410 between the second cell and the relay station 150, and a channel 420 between the second cell and the second BS 140, respectively.

Here, the first BS 130 and the second BS 140 that correspond to the reception nodes receive signals transmitted from the terminals 110-1 to 110-$k$ belonging to the first cell and the terminals 120-1 to 120-$k$ belonging to the second cell in a first phase. At this time, in the first phase, the signal which the first BS 130 receives from the second cell through the channel 430 may be an interference signal and, more specifically, an inter-cell interference signal. Similarly, in the first phase, the signal which the second BS 140 receives from the first cell through the channel 435 may be an interference signal or an inter-cell interference.

In a second phase, the first BS 130 and the second BS 140 receive signals from the relay station 150. That is, in the second phase, the first BS 130 receives the signal from the relay station 150 through the channel 440 and the second BS 140 receives the signal from the relay station 150 through the channel 445. At this time, the signals which the first BS 130 and the second BS 140 receive from the relay station 150 may be handled as interference signals.

An interference alignment scheme in cellular network uplink communication using the half-duplex scheme relay is described below.

Figure 5:
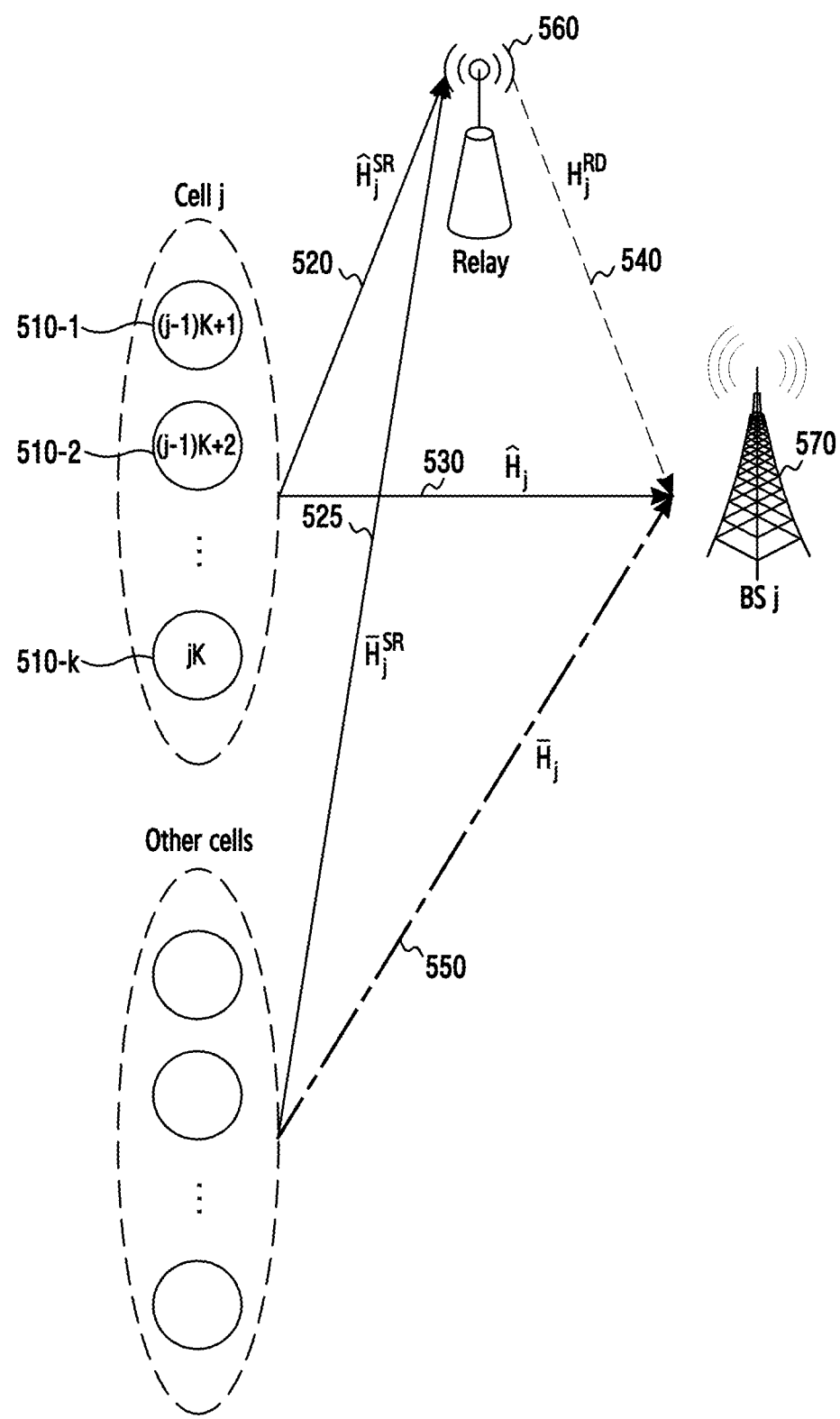
FIG. 5 illustrates an example uplink communication channel environment in a wireless communication system using a half-duplex relay according to an embodiment of the present disclosure.

FIG. 5 illustrates an example uplink communication channel environment in a wireless communication system using a half-duplex relay according to an embodiment of the present disclosure.

FIG. 5 considers an uplink communication environment in which there are C cells, K terminals (for example, terminals 510-1 to 510-$k$) exist in each cell, each terminal has M antennas, each BS (for example, BS 570) has N antennas, and a relay station (for example, relay station 560) has antennas. Terminal indexes of cell j serviced by BS j are (j−1)K+1, (j−1)K+2, . . . , jK. A channel matrix illustrated in FIG. 5 is defined as Table 1 below.

TABLE 1

| | |
|---|---|
| $H_{j,i}$ | Channel from terminal i to BS j |
| $H_i^{SR}$ | Channel from terminal i to relay station |
| $H_j^{RD}$ | Channel from relay station to BS j |

The size of channel matrix $H_{j,i}$ from terminal I to BS j is N×M, the size of channel matrix $H_i^{SR}$ from terminal i to the relay station is $N_R$×M, and the size of channel matrix $H_j^{RD}$ from the relay station to BS j is N×$N_R$. Here, M denotes a number of antennas per terminal, N denotes a number of antennas per BS, and denotes a number of antennas of the relay station. Channel matrixes that define channels 520, 525, 530, 540, and 550 in FIG. 5 are defined as Table 2 below.

TABLE 2

| | |
|---|---|
| $\overline{H}_j \triangleq [H_{j,1}, \ldots, H_{j,(j-1)K}, H_{j,jK+1}, \ldots, H_{j,CK}]$ | Channel from terminals of another cell that gives interference to BS j to BS j |
| $\overline{H}_j^{SR} \triangleq [H_1^{SR}, \ldots, H_{(j-1)K}^{SR}, H_{jK+1}^{SR}, \ldots, H_{CK}^{SR}]$ | Channel from terminals of another cell that gives interference to BS j to relay station |
| $\hat{H}_j \triangleq [H_{j,(j-1)K+1}, \ldots, H_{j,jK}]$ | Channel from terminals of cell j to BS j |
| $\hat{H}_j^{SR} \triangleq [H_{(j-1)K+1}^{SR}, \ldots, H_{jK}^{SR}]$ | Channel from terminals of cell j to relay station |

The size of channel matrix $\overline{H}_j$ from terminals of another cell that gives interference to BS j to BS j is N×M(C−1)K, the size of channel matrix $\overline{H}_j^{SR}$ from terminals that give interference to BS j to the relay station is $N_R$×M (C−1)K, the size of channel matrix $\hat{H}_j^{SR}$ from terminals of cell j to BS j is N×MK, and the size of channel matrix $\hat{H}_j^{SR}$ from terminals of cell j to the relay station is $N_R$×MK.

Signals from the terminals may be divided into inter-cell interference and a signal, which is not the inter-cell interference, having a column vector form as shown in Table 3 below.

TABLE 3

| | |
|---|---|
| $\overline{X}_j \triangleq [X_1^T, \ldots, X_{(j-1)K}^T, X_{jK+1}^T, \ldots, X_{CK}^T]^T$ | Inter-cell interference signal received by BS j |
| $\hat{X}_j \triangleq [X_{(j-1)K+1}^T, \ldots, X_{jK}^T]^T$ | Signal of cell j received by BS j |

In a first time slot, a signal received by BS j is as shown in equation (1) below.

$$y_{j,1} = \hat{H}_j \hat{x}_j + \overline{H}_j \overline{x}_j \qquad \text{equation (1)}$$

In equation (1), $y_{j,1}$ denotes a signal received by BS j in a first time slot, $\hat{H}_j$ denotes a channel from terminals of cell j to BS j, $\overline{H}_j$ denotes a channel from terminals of another cell that gives interference to BS j to BS j, $\hat{x}_j$ denotes a signal of cell j received by BS j, and $\overline{x}_j$ denotes an inter-cell interference signal received by BS j.

In a second time slot, a signal received by the BS is as shown in equation (2) below.

$$y_{j,2} = H_j^{RD} T \hat{H}_j^{SR} \hat{x}_j + H_j^{RD} T \overline{H}_j^{SR} \overline{x}_j \qquad \text{equation (2)}$$

In equation (2), $y_{j,2}$ denotes a signal received by BS j in a second time slot, $H_j^{RD}$ denotes a channel from the relay station to BS j, T denotes a beamforming matrix used in the relay station, $\hat{H}_j^{SR}$ denotes a channel from terminals of cell j to the relay station, $\overline{H}_j^{SR}$ denotes a channel from terminals that give interference to BS j to the relay station, $\overline{x}_j$ denotes a signal of cell j received by BS j, and $\overline{x}_j$ denotes an inter-cell interference signal received by BS j.

Equation (3) below is generated by adding equation (1) and equation (2).

$$y_{j,1} + y_{j,2} = (\hat{H}_j + h_j^{RD} T \hat{H}_j^{SR}) \hat{x}_j + (\overline{H}_j + H_j^{RD} T \overline{H}_j^{SR}) \overline{x}_j \qquad \text{equation (3)}$$

In equation (3), $y_{j,1}$ denotes a signal received by BS j in the first time slot, $y_{j,2}$ denotes a signal received by BS j in the second time slot, $\hat{H}_j$ denotes a channel from terminals of cell j to BS j, $\overline{H}_j$ denotes a channel from terminals of another cell that gives interference to BS j to BS j, $H_j^{RD}$ denotes a channel from the relay station to BS j, $\overline{H}_j^{SR}$ denotes a channel from terminals of cell j to the relay station, T denotes a channel from terminals that give interference to BS j to the relay station, denotes a beamforming matrix used in the relay station, $\hat{x}_j$ denotes a signal of cell j received by BS j, and $\overline{x}_j$ denotes an inter-cell interference signal received by BS j.

A condition to remove interference signal $\overline{x}_j$ in BS j is $\overline{H}_j + H_j^{RD} T \overline{H}_j^{SR} = 0$, which corresponds to an interference alignment condition in BS j. Accordingly, beamforming matrix T is determined based on a channel between at least one interference source (for example, terminal) and the relay station, a channel between the relay station and a reception node (for example, BS), and a channel between at least one interference source (for example, terminal) and a reception node (for example, BS). More specifically, beamforming matrix T may be determined by multiplying a first matrix, which is determined based on the channel between at least one interference source (for example, terminal) and the relay station and the channel between the relay station and the reception node (for example, BS), and a second matrix, which is determined based on channel information between at least one interference source (for example, terminal) and the reception node (for example, BS). For example, beamforming matrix T may be determined by an inverse vectorization operation for the multiplication of the first matrix and the second matrix. More specifically, beamforming matrix T that is satisfied with all BS j is as shown in equation (4) below.

$$T \overset{def}{=} vec^{-1} \left( \begin{bmatrix} (\overline{H}_1^{SR})^T \otimes H_1^{RD} \\ (\overline{H}_2^{SR})^T \otimes H_2^{RD} \\ \vdots \\ (\overline{H}_C^{SR})^T \otimes H_C^{RD} \end{bmatrix}^{-1} \begin{bmatrix} vec(-\overline{H}_1) \\ vec(-\overline{H}_2) \\ \vdots \\ vec(-\overline{H}_C) \end{bmatrix} \right) \qquad \text{equation (4)}$$

In equation (4), T denotes a beamforming matrix used in the relay station, $\overline{H}_j^{SR}$ denotes a channel from terminals that give interference BS j to the relay station, $H_j^{RD}$ denotes a channel from the relay station to BS j, and $\overline{H}_j$ denotes a channel from terminals of other cells that give interference BS j to BS j. vec(•) denotes a vectorization operator for the matrix, $vec^{-1}(\bullet)$ denotes an inverse operator of vec(•), an inverse vectorization operation corresponds to an operator that sequentially arranges the vector starting from a first column and makes matrix $N_R \times N_R$, $(\bullet)^T$ denotes a transpose matrix operator, $\otimes$ denotes a kronecker product operator, and $[\bullet]^{-1}$ denotes an operator for an inverse matrix and a pseudo inverse matrix.

Accordingly, beamforming matrix T is determined to make a result, which is generated by adding a channel matrix between a transmission node of a neighbor cell (a terminal of the neighbor cell in uplink communication) and a reception node (the BS in uplink communication) and a matrix, which is generated by multiplying a channel matrix between the relay station and the reception node, a beamforming matrix, and a channel matrix between the transmission node of the neighbor cell and the relay station, become a zero matrix. Here, the zero matrix refers to a matrix in which all values therein are 0. However, the zero matrix includes not only the matrix in which all values are necessarily physically 0, but also a matrix having values equal to or smaller than a predetermined reference value according to the purpose of interference cancelation. For example, when the reference value is 10−3, matrixes having values smaller than or equal to 10−3 may be the zero matrix.

Through relay station beamforming, inter-cell interference may be finally removed. An effective channel for signal of cell j received by BS j is as shown in equation (5) below.

$$\hat{H}_{effective} = \hat{H}_j + H_j^{RD} T \hat{H}_j^{SR} \qquad \text{equation (5)}$$

In equation (5), $\hat{H}_{effective}$ denotes an effective channel for a signal of cell j received by BS j, $\hat{H}_j$ denotes a channel from terminals of cell j to BS j, $H_j^{RD}$ denotes a channel from the relay station to BS j, and $\hat{H}_j^{SR}$ denotes a channel from terminals of cell j to the relay station.

The BS corresponding to the reception node may separate an intra-cell signal by designing a filter for separating the intra-cell signal as shown in equation (6).

$$U_j = (\hat{H}_{effective})^{-1} \qquad \text{Equation (6)}$$

In equation (6), $U_j$ denotes a filter for separating an inter-cell signal by BS j, and $\hat{H}_{effective}$ denotes an effective channel for signals of terminals in cell j received by BS j.

In a case of N≠MK (K denotes a number of terminals per cell, M denotes a number of antennas per terminal, and N denotes a number of antennas per BS), the effective channel is not a square matrix, so that $U_j$ may be designed as a pseudo inverse matrix of $\hat{H}_{effective}$. Finally, degrees of freedom per cell that can be acquired at this time is as shown in equation (7) below.

$$DoF_{cell} = \tfrac{1}{2} \min(KM, N) \qquad \text{equation (7)}$$

In equation (7), $DoF_{cell}$ denotes Degrees-of-Freedom (DoF) per cell, K denotes a number of terminals per cell, M denotes a number of antennas per terminal, and denotes a number of antennas per BS.

The size of channel matrix $\hat{H}_{effective}$ corresponding to a channel for signals of terminals of cell j received by BS j is N×MK and interference within the system has been aligned, so that data can be transmitted and received without interference through a path of a smaller one between N and MK in cell j during a one transmission process. The one transmission process is performed using two time slots, and thus degrees of freedom of transmission is ½min(KM,N).

The DOF generated by comparing KM and N, selecting a minimum value, and then multiplying the minimum value by 0.5 means that KM transmission antennas or N reception antennas as illustrated in equation (7) may have redundancy. In other words, the DOF of FIG. 7 means that max(KM, N)−min(KM,N) antennas cannot be used for increasing a data transmission rate through additional transmission. As described above, when antenna redundancy is generated in the system, it is possible to reduce power consumption of a corresponding node by turning off a corresponding antenna or to seek gains for decreasing beamformer design complexity and power consumption.

The DOF used as a scale of transmission efficiency theoretically refers to a coefficient preceding a log function of a channel capacity equation. In other words, the DOF may be an amount of information (a number of data symbols) which can be transmitted and decoded whenever a channel is used. The interference alignment scheme using the half-duplex relay decreases by half in the DOF compared to the interference alignment scheme using the full-duplex relay. However, in a case of N=MK, that is, when the number N of antennas per BS is the same as a multiplication of the number M of antennas per terminal and the number K of terminals per cell, the interference alignment scheme according to various embodiments of the present disclosure may acquire the DOF equal to that acquired by the interference alignment scheme using the full-duplex relay.

According to an embodiment of the present disclosure, the interference alignment is achieved through relay station beamforming, so that resources are guaranteed through the number of antennas of the relay station. A relay antenna condition to achieve perfect interference alignment is as shown in equation (8) below.

$$N_R \geq \max((C-1)KM, CN) \quad \text{equation (8)}$$

$N_R$ denotes a number of antennas of the relay station to achieve the perfect interference alignment, C denotes a number of cells, K denotes a number of terminals per cell, M denotes a number of antennas per terminal, and N denotes a number of antennas per BS.

It may be noted that the transmission node is not required to feedback and process channel information in a process of achieving the interference alignment and only two fixed time slots are used for decoding one symbol regardless of the number of terminals and the number of cells. This means that the reception node can rapidly decode data and a required correlation time within the cannel is short.

Figure 6A:
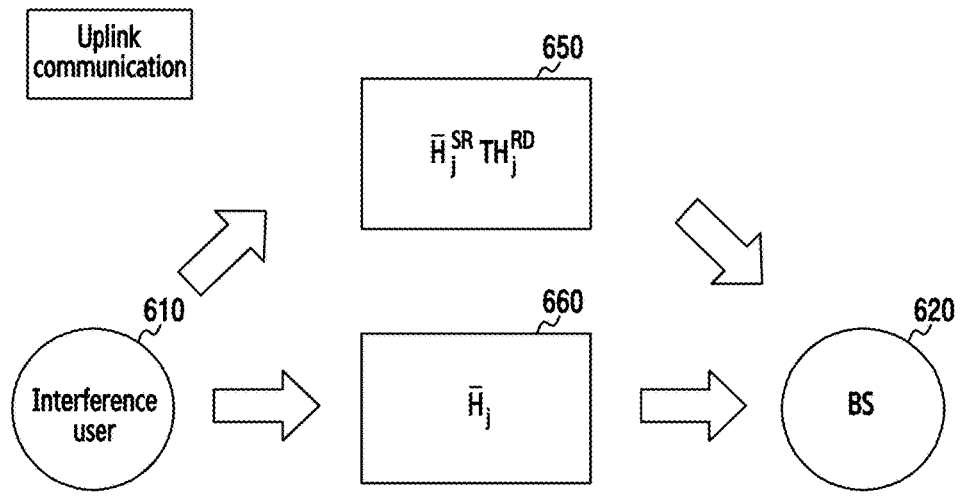
FIGS. 6A and 6B illustrate an example uplink communication and downlink communication in a wireless communication system using a half-duplex relay according to an embodiment of the present disclosure.
Figure 6B:
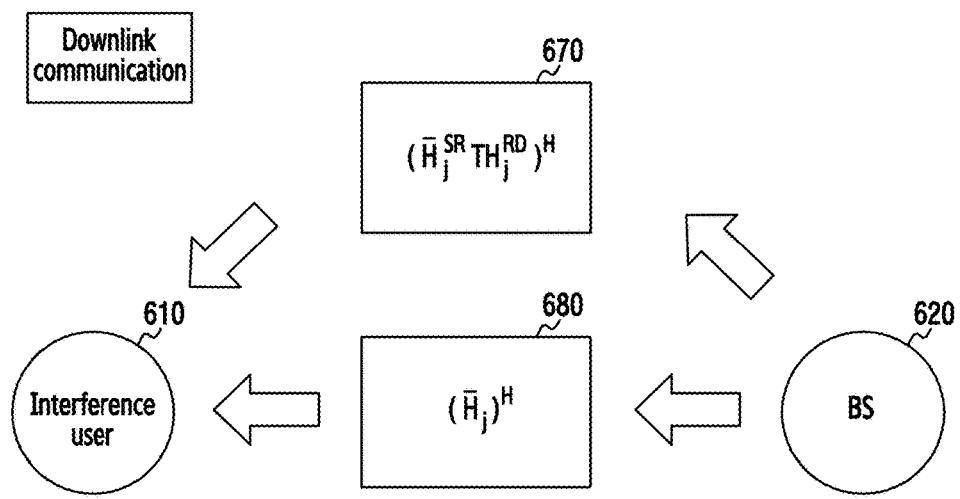

FIGS. 6A and 6B illustrate an example uplink communication and downlink communication in a wireless communication system using a half-duplex relay station according to an embodiment of the present disclosure. FIG. 6A illustrates uplink communication, and FIG. 6B illustrates downlink communication.

The same scheme may be applied to downlink communication through duality principles of the uplink communication and the downlink communication. The duality principles mean that the interference alignment can be achieved if a scheme which can be applied to uplink communication when a reciprocity relationship is established between a downlink communication channel matrix and an uplink communication channel matrix (a complex conjugate transpose matrix of the channel matrix in uplink communication) is performed according to an inverse order of downlink communication. When the channel reciprocity is satisfied, the existence of downlink interference can be shown based on interference alignment in uplink, and thus the interference alignment scheme can be easily designed. Accordingly, the present document provides an interference alignment scheme in downlink communication of a network in which reciprocity is satisfied. However, an embodiment of the present disclosure may be applied to not only a case where channel reciprocity is satisfied but also a general network environment where reciprocity is not satisfied.

Channel matrix reciprocity of uplink-downlink communication is as shown in equation (9) below.

$$D_{i,j} = (H_{j,i})^H \quad \text{equation (9)}$$

A channel matrix from BS j to terminal i in downlink communication corresponds to a complex conjugate transpose matrix of a channel matrix from terminal i to BS j in uplink communication.

As illustrated in FIGS. 6A and 6B, conditions $(H_i^{RD}TH_i^{SR})^H = (H_i^{SR})^H T^H (H_j^{RD})^H = D_i^{RD} G D_j^{SR}$ and $D_{i,j} + D_i^{RD} G D_j^{SR} = 0$ for interference alignment should be met.

Channel matrixes in downlink communication to meet the above condition are described in Table 4 below.

TABLE 4

| | |
|---|---|
| $D_j^{SR} \triangleq (H_j^{RD})^H$ | Channel from BS j to relay station |
| $D_i^{RD} \triangleq (H_i^{SR})^H$ | Channel from relay station to terminal i |
| $\overline{D}_i \overset{def}{=} [D_{i,1} \ \ldots \ D_{i,\lfloor \frac{i}{K} \rfloor} \ D_{i,\lfloor \frac{i}{K} \rfloor+2} \ \ldots \ D_{i,C}]$ | Channel from BSs of another cell that gives interference to terminal i to terminal i |
| $\overline{D}_i^{SR} \overset{def}{=} [D_1^{SR} \ \ldots \ D_{\lfloor \frac{i}{K} \rfloor}^{SR} \ D_{\lfloor \frac{i}{K} \rfloor+2}^{SR} \ \ldots \ D_C^{SR}]$ | Channel from BSs of another cell that gives interference to terminal i to relay station |
| $\overline{x}_i \overset{def}{=} [x_1^T \ \ldots \ x_{\lfloor \frac{i}{K} \rfloor}^T \ x_{\lfloor \frac{i}{K} \rfloor+2}^T \ \ldots \ x_C^T]^T$ | Inter-cell interference signal received by terminal i |

The channel matrixes shown in Table 4 are defined as equations (10) to (13) below.

$$D_j^{SR} \overset{def}{=} (H_j^{RD})^H \quad \text{equation (10)}$$

$D_j^{SR}$ denotes a channel from BS j to the relay station and corresponds to a complex conjugate transpose matrix of channel matrix from the relay station to BS j in uplink communication.

$$D_i^{RD} \overset{def}{=} (H_i^{SR})^H \quad \text{equation (11)}$$

$D_i^{RD}$ denotes a channel from the relay station to terminal i and corresponds to a complex conjugate transpose matrix of channel matrix $H_i^{SR}$ from terminal i to the relay station in uplink communication.

$$\overline{D}_i \overset{def}{=} [D_{i,1} \ \cdots \ D_{i,\lfloor \frac{i}{K} \rfloor} \ D_{i,\lfloor \frac{i}{K} \rfloor+2} \ \cdots \ D_{i,C}] = \quad \text{equation (12)}$$
$$[H_{1,i}^H \ \cdots \ H_{\lfloor \frac{i}{K} \rfloor,i}^H \ H_{\lfloor \frac{i}{K} \rfloor+2,i}^H \ \cdots \ H_{C,i}^H]$$

$\overline{D}_i$ denotes a channel from BSs of another cell that gives interference to terminal i to terminal i and corresponds to a set matrix of a complex conjugate transpose matrix of channels from terminal i to BSs of another cell, which are not BS corresponding to a serving BS of terminal i.

$$\overline{D}_i^{SR} \stackrel{def}{=} \left[ D_1^{SR} \cdots D_{\lfloor \frac{i}{K} \rfloor}^{SR} D_{\lfloor \frac{i}{K} \rfloor+2}^{SR} \cdots D_C^{SR} \right] =$$ equation (13)

$$\left[ (H_1^{RD})^H \cdots \left(H_{\lfloor \frac{i}{K} \rfloor}^{RD}\right)^H \left(H_{\lfloor \frac{i}{K} \rfloor+2}^{RD}\right)^H \cdots (H_C^{RD})^H \right]$$

$\overline{D}_i^{SR}$ denotes a channel from BSs of another cell that gives interference to terminal i to the relay station and corresponds to a set matrix of a complex conjugate transpose matrix of channels from the relay station to BSs of another cell, which are not $$BS^{\lfloor \frac{i}{K} \rfloor+1}$$

corresponding to the serving BS of terminal i.

When equations (10) to (13) are satisfied, the same scheme of the uplink communication may be applied and, at this time, relay station beamforming $G=(T)^H$ for downlink communication may be designed as equation (14) below.

$$G \stackrel{def}{=} vec^{-1} \left( \begin{bmatrix} (\overline{D}_1^{SR})^T \otimes D_1^{RD} \\ \vdots \\ (\overline{D}_1^{SR})^T \otimes D_K^{RD} \\ (\overline{D}_2^{SR})^T \otimes D_{K+1}^{RD} \\ \vdots \\ (\overline{D}_C^{SR})^T \otimes D_{CK}^{RD} \end{bmatrix}^{-1} \begin{bmatrix} vec(-\overline{D}_1) \\ vec(-\overline{D}_2) \\ \vdots \\ vec(-\overline{D}_{CK}) \end{bmatrix} \right)$$ equation (14)

G denotes a relay station beamforming matrix for downlink communication, $\overline{D}_i^{SR}$ denotes a channel from BSs of another cell that gives interference to terminal i to the relay station, $D_i^{RD}$ denotes a channel from the relay station to terminal i, $\overline{D}_i$ denotes a channel from BSs of another cell that gives interference to terminal i to terminal i. vec(•)denotes a vectorization operator for the matrix, vec$^{-1}$(•) denotes an inverse operator of vec(•), (•)$^H$ denotes a complex conjugate transpose matrix operator, $\otimes$ denotes a kronecker product operator, (•)$^T$ denotes a transpose matrix operator, and [•]$^{-1}$ denotes an operator for an inverse matrix and a pseudo inverse matrix.

Beamforming matrix G is determined based on a channel between the transmission node (for example, BS) and the relay station, the channel between the relay station and at least one reception node (for example, terminal of a neighbor cell) that receives interference), and a channel between the transmission node and at least one reception node that receives interference. More specifically, beamforming matrix G may be determined by multiplying a first matrix, which is determined based on a channel between at least one transmission node and the relay station and a channel between the relay station and at least one reception node that receives interference, and a second matrix, which is determined based on information on a channel between the transmission node and at least one reception node that receives interference. For example, beamforming matrix G may be determined by an inverse vectorization operation for the multiplication of the first matrix and the second matrix.

More specifically, relay station beamforming matrix G for downlink communication is determined to make a result, which is generated by adding a channel matrix between a transmission node of a neighbor cell (BS of the neighbor cell in downlink communication) and a reception node (terminal in downlink communication) and a matrix, which is generated by multiplying a channel matrix between the relay station and the reception node (terminal in downlink communication), a beamforming matrix, and a channel matrix between the transmission node of the neighbor cell (BS of the neighbor cell in downlink communication) and the relay station, become a zero matrix. Here, the zero matrix refers to a matrix having all values therein are 0. However, the zero matrix includes not only the matrix in which all values are necessarily physically 0, but also a matrix having values equal to or smaller than a predetermined reference value according to the purpose of interference cancelation. For example, when the reference value is 10-3, matrixes having values smaller than or equal to 10-3 may be the zero matrix.

In downlink communication, instead of designing a reception node filter for separating interference between signals within the cell, a transmission node beamformer may be designed. At this time, in order to design a BS beamformer, the terminal corresponding to the reception node may feedback channel information to the BS. Accordingly, the terminal does not design the filter for separating the signal and does not need a channel information processing capability for designing the reception node filter like in the uplink communication. The beamformer in BS j may be designed as shown in equation (15) below.

$$A_j \stackrel{def}{=} \begin{bmatrix} D_{(j-1)K+1,j} + D_{(j-1)K+1}^{RD} G D_j^{SR} \\ \vdots \\ D_{jK,j} + D_{jK}^{RD} G D_j^{SR} \end{bmatrix}^{-1}$$ equation (15)

$A_j$ denotes a beamformer in BS j or a beamforming matrix. G denotes a relay station beamforming matrix for downlink communication, $D_{i,j}$ denotes a channel from BS j to terminal i in downlink communication, $D_i^{RD}$ denotes a channel from the relay station to terminal i in downlink communication, and $D_j^{SR}$ denotes a channel from BS j to the relay station.

In this case, degrees of freedom per cell are ½min (N,MK), which is the same value as that in uplink communication. Here, K denotes a number of terminals per cell, M denotes a number of antennas per terminal, and N denotes a number of antennas per BS.

Figure 7:
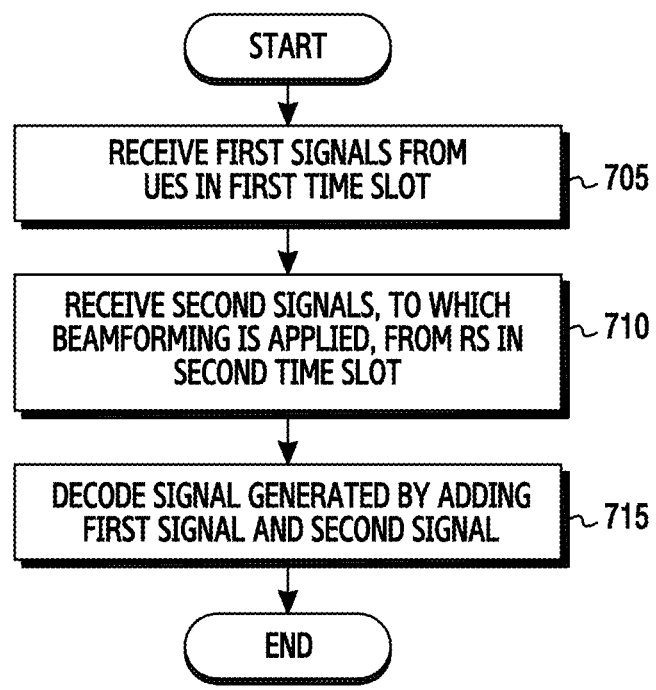
FIG. 7 illustrates a flowchart of an operation of a BS in uplink communication according to an embodiment of the present disclosure.

FIG. 7 illustrates a flowchart of an operation of the BS according to an embodiment of the present disclosure. FIG. 7 illustrates a case where the BS operates as a reception node. In uplink communication, a transmission node corresponds to the terminal and the reception node corresponds to the BS.

In step 705, the BS receives first signals including a signal received through a channel between at least one terminal belonging to a serving cell of the BS and the BS and a signal received through a channel between at least one terminal belonging to a cell of a neighbor cell and the BS in a first time slot. Here, the signal received through the channel between at least one terminal belonging to the serving cell of the BS and the BS is a desired signal, but the signal received through the channel between at least one terminal belonging to the cell of the neighbor BS and the BS is an interference signal, that is, an inter-cell interference signal.

In step 710, the BS receives a second signal, to which a beamforming matrix is applied, from the relay station in a second time slot. In other words, the BS receives the beamformed second signal. For example, the second signal may include a signal generated by applying the beamforming matrix to a signal received through a channel between the terminal belonging to the serving cell of the BS and the relay station and a signal generated by applying the beamforming matrix to a signal received through a channel between the terminal belonging to the cell of the neighbor BS and the relay station.

In step 715, the BS decodes a signal acquired by adding the first signal and the second signal. According to some embodiments, a filter for separating an intra-cell signal may be applied and a signal, to which the filter is applied, may be decoded.

According to some embodiments, the BS may acquire information on a channel between the relay station and the BS and transmit information on a channel between the terminal and the BS and the information on the channel between the relay station and the BS to the relay station. For example, the BS may receive a Reference Signal (RS) from the terminal, acquire information on the channel between the terminal belonging to the serving cell of the BS and the BS and information on the channel between the terminal belonging to the cell of the neighbor BS and the BS by using the reference signal, and may acquire beamformer information, information on the channel between the terminal belonging to the serving cell of the BS and the relay station, and information on the channel between the terminal belonging to the cell of the neighbor BS and the relay station from the relay station. Further, the BS may acquire information on the channel between the relay station and the terminal by using the reference signal received from the relay station. Here, the reference signal may refer to a signal known to both the transmitting side and the receiving side, which is used for channel estimation, and may be called a pilot signal.

Figure 8:
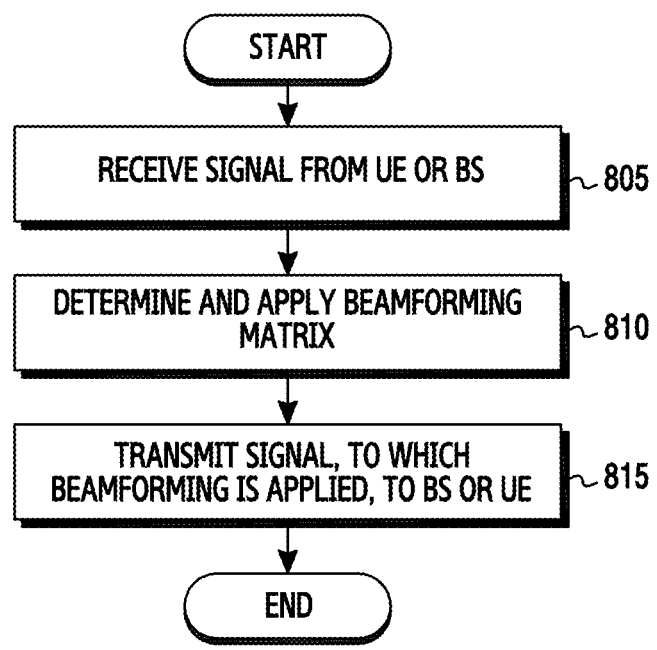
FIG. 8 illustrates a flowchart of an operation of a relay station according to an embodiment of the present disclosure.

FIG. 8 illustrates a flowchart of an operation of the relay station according to an embodiment of the present disclosure.

In step 805, the relay station receives a signal from the transmission node. In uplink communication, the transmission node corresponds to the terminal and the reception node corresponds to the BS. In uplink communication, signals received by the relay station may include a signal received through a channel between a terminal belonging to a serving cell of the BS and the relay station and a signal received through a channel between a terminal belonging to a cell of a neighbor BS and the relay station. In downlink communication, the transmission node corresponds to the BS and the reception node corresponds to the terminal. In downlink communication, signals received by the relay station may include a signal received through a channel between the relay station and the serving BS and a signal received through a channel between the relay station and the neighbor BS.

In step 810, the relay station determines a beamforming matrix and applies the beamforming matrix to the received signal. The beamforming matrix is determined to remove an inter-cell interference component from the signal generated by adding the signal received in the first time slot and the signal received in the second time slot by the reception node.

In uplink communication, the relay station may receive information on the channel between the terminal and the BS and the channel between the terminal belonging to the cell of the neighbor BS and the BS, and information on the channel between the relay station and the BS from the BS or the terminal, and may estimate the information on the channel between the terminal belonging to the serving cell of the BS and the relay station and a channel between a terminal belonging to a cell of another BS and the relay station by using reference signals received from terminals. Based on the channel information, the relay station may determine the beamforming matrix. Additionally, the relay station may transmit relay beamformer information to the BS to design a reception node filter.

In downlink communication, the relay station may receive information on the channel between the terminal and the serving BS and the channel between the terminal and the neighbor BS and information on the channel between the relay station and the terminal from the terminal or the BS, and may estimate information on the channel between the BS and the relay station and the channel between the neighbor BS and the relay station by using reference signals received from BSs. Additionally, the relay station may transmit relay station beamformer information to the BS to design a transmission node beamformer.

In step 815, the relay station transmits a signal, to which the beamforming is applied, to the BS or the terminal. The BS or the terminal, which corresponds to the reception node, may decode a signal generated by adding the signal received in the first time slot and the signal, to which the beamforming is applied, received in the second time slot, thereby performing interference alignment.

According to some embodiments, the relay station may receive a reference signal for channel estimation from the terminal or the BS, and may estimate the channel between the terminal or the BS and the relay station by using the reference signal.

Figure 9:
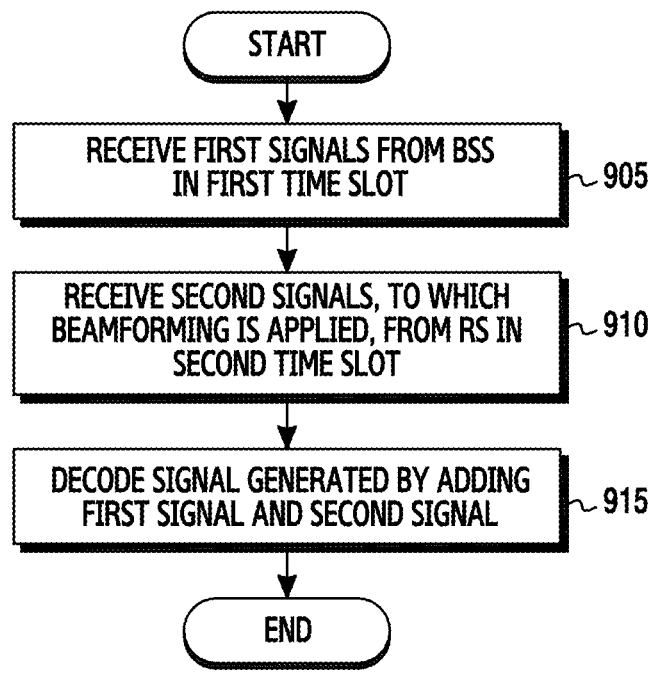
FIG. 9 illustrates a flowchart of an operation of a terminal in downlink communication according to an embodiment of the present disclosure.

FIG. 9 illustrates a flowchart of an operation of the terminal according to an embodiment of the present disclosure. FIG. 9 illustrates a case of downlink communication in which the terminal operates as the reception node.

In step 905, the terminal receives first signals from BSs in a first time slot. For example, the first signals include a signal received through a channel between the terminal and a serving BS of the terminal and a signal received through a channel between the terminal and a neighbor BS, and second signals include a signal generated by applying a beamforming matrix to a signal received through a channel between the serving BS and the relay station and a signal generated by applying the beamforming matrix to a signal received through a channel between the neighbor BS and the relay station. Here, the signal received through the channel between the terminal and the serving BS of the terminal is a desired signal, but the signal received through the channel between the terminal and the neighbor BS is an interference signal, that is, an inter-cell interference signal.

In step 910, the terminal receives the second signal, to which the beamforming is applied, from the relay station in the second time slot. The beamforming matrix is determined based on channel information and, more particularly, information on the channel between the terminal and the neighbor BS, the channel between the neighbor BS and the relay station, and the channel between the relay station and the terminal, and is determined to remove an interference signal received from a neighbor BS, which is not the serving BS of the terminal.

In step 915, the terminal decodes a signal acquired by adding the first signal and the second signal. According to some embodiments, transmission beamforming may be applied to the BS corresponding to the transmission node to separate an intra-cell signal, and the terminal may separate the intra-cell signal without designing the reception node filter. In downlink communication, the terminal transmits information on the channel between the relay station and the terminal and information on the channel between the BS and the terminal to the relay station and the BS to design the relay station beamformer and the BS beamformer.

Covering all cells within the cellular network through the half-duplex relay station has realistically spatial restrictions, and thus the present disclosure considers a 3-cell cluster. The 3-cell cluster corresponds to a scheme in which one relay station assists in interference alignment of 3 cells and has a topological structure in which uniform power can be distributed to all regions assisted by the relay station in a generally assumed hexagonal cell structure. The 3-cell cluster has a structure as illustrated in FIG. 10.

Figure 10:
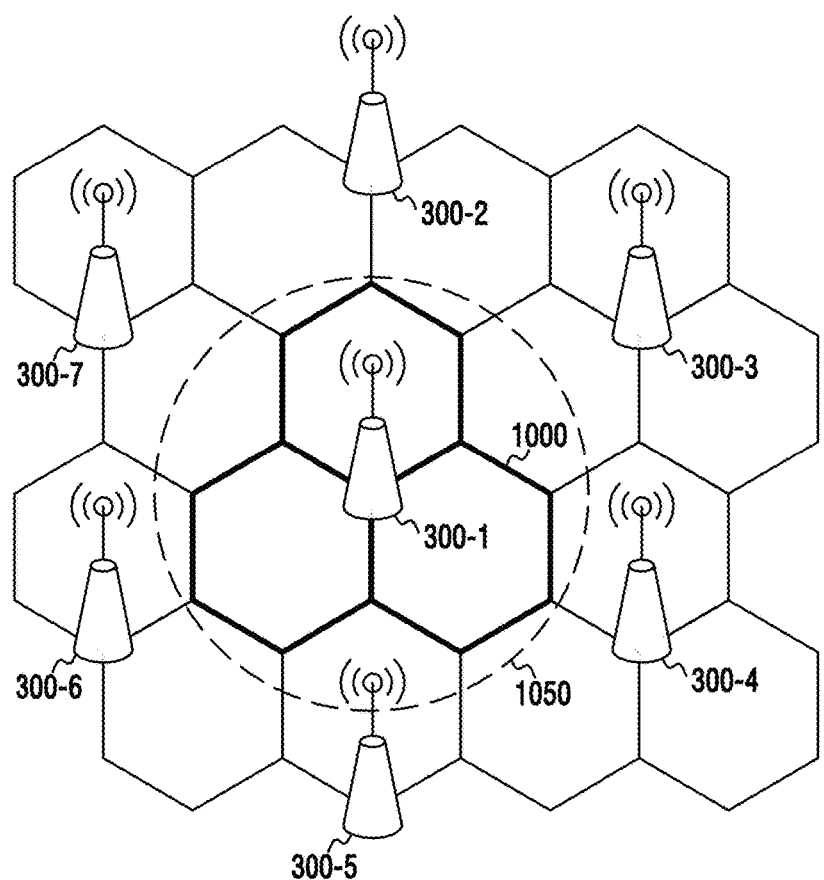
FIG. 10 illustrates an example wireless communication system in which there is an interference environment outside a 3-cell cluster according to an embodiment of the present disclosure.

FIG. 10 illustrates an example wireless communication system in which there is an interference environment outside the 3-cell cluster according to an embodiment of the present disclosure. In an environment of FIG. 10, inter-cluster interference may exist. If an algorithm is designed based on an assumption that all clusters have interference therebetween, even an interference signal having a low strength, which can actually be ignored, should be considered for beamforming calculations. As a result, radio resource waste becomes very serious compared to improvement of the performance. Accordingly, only a partially strong interference strength is considered, and such terminals are referred to as cluster boundary terminals. At this time, interference that the relay station gives to another cluster may be removed through a power control.

Figure 11:
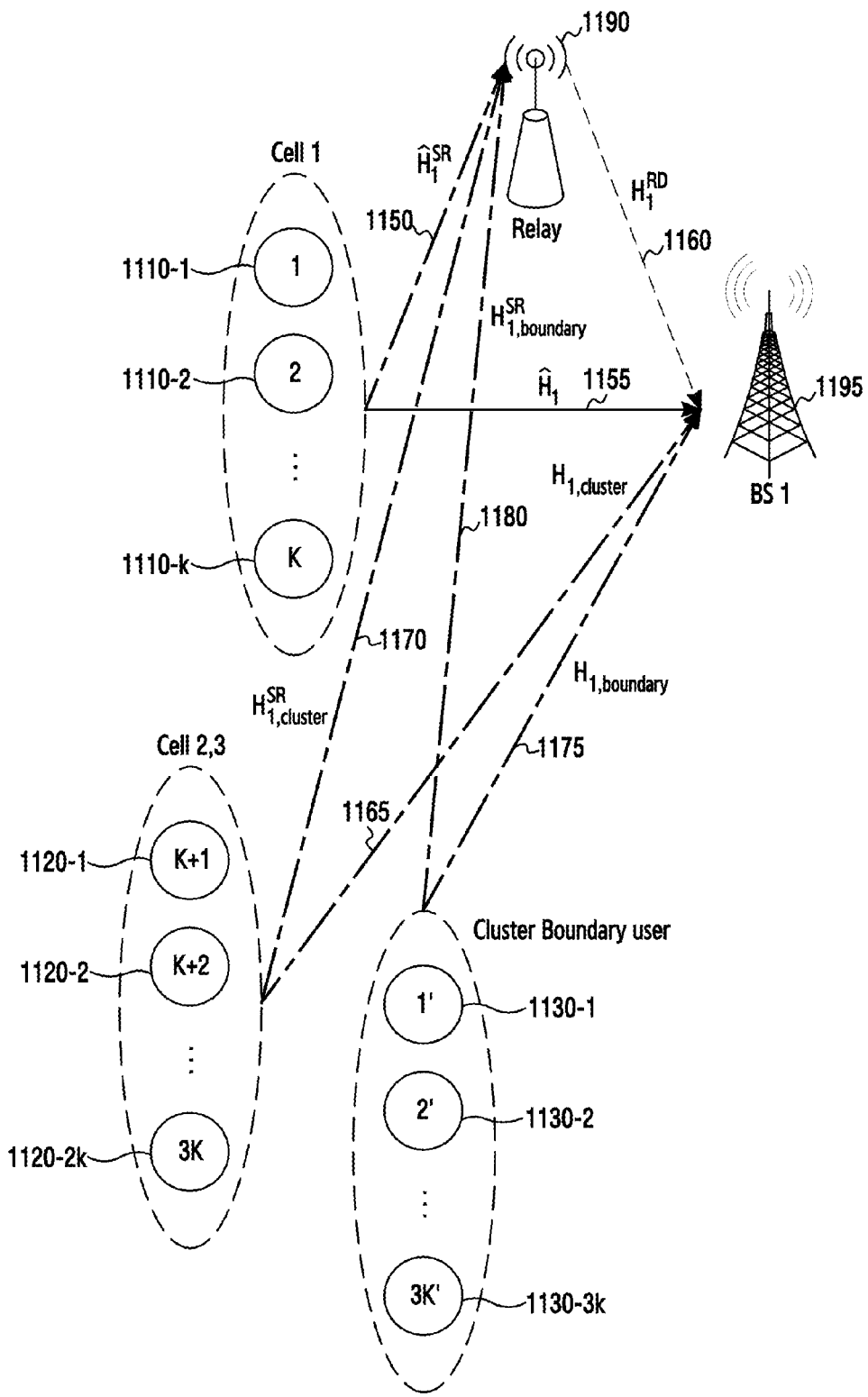
FIG. 11 illustrates an example wireless communication system in which there is interference by a cluster boundary user according to an embodiment of the present disclosure.

FIG. 11 illustrates an example wireless communication system in which there is interference by a cluster boundary user according to an embodiment of the present disclosure. Channel matrixes newly defined in FIG. 11 (for example, channel matrixes for channels 1165, 1170, 1175, and 1180 in FIG. 11) are as shown in Table 5 below.

TABLE 5

| | |
|---|---|
| $H_{j,\ cluster} = [H_{j,\ 1}, \ldots, H_{j,\ (j-1)K}, H_{j,\ jK+1}, \ldots, H_{j,\ 3K}]$ | Channel from interference cell within cluster including cell j to BS j |
| $H_{j,\ cluster}^{SR} = [H_1^{SR}, \ldots, H_{(j-1)K}^{SR}, H_{jK+1}^{SR}, \ldots, H_{3K}^{SR}]$ | Channel from interference cell within cluster including cell j to relay station |
| $H_{j,\ boundary} = [H_{j,\ 1'}, H_{j,\ 2'}, \ldots, H_{j,\ 3K'}]$ | Channel from cluster boundary terminal including cell j to BS j |
| $H_{j,\ boundary}^{SR} = [H_{1'}^{SR}, H_{2'}^{SR}, \ldots, H_{3K'}^{SR}]$ | Channel from cluster boundary terminal including cell j to relay station |

In order to design beamforming for interference alignment, a channel matrix may be defined as Table 6 below.

TABLE 6

| | |
|---|---|
| $\overline{H}_j \triangleq [H_{j,\ cluster}, H_{j,\ boundary}]$ | Interference channel from viewpoint of BS j |
| $\overline{H}_j^{SR} \triangleq [H_{j,\ cluster}^{SR}, H_{j,\ boundary}^{SR}]$ | Interference channel through relay station from viewpoint of BS j |
| $\hat{H}_j \triangleq [H_{j,\ (j-1)K+1}, \ldots, H_{j,\ jK}]$ | Channel from terminals of cell j to BS j |
| $\hat{H}_j^{SR} \triangleq [H_{(j-1)K+1}^{SR}, \ldots, H_{jK}^{SR}]$ | Channel from terminals of cell j to relay station |

A condition to remove interference signal $\overline{x}_j$ in BS j is $\overline{H}_j + H_j^{RD} T \overline{H}_j^{SR} = 0$, which corresponds to an interference alignment condition in BS j. Accordingly, beamforming matrix T is determined based on a channel between at least one interference source (for example, terminal) and the relay station, a channel between the relay station and a reception node (for example, BS), and a channel between at least one interference source (for example, terminal) and a reception node (for example, BS). More specifically, beamforming matrix T may be determined by a multiplication of a first matrix, which is determined based on the channel between at least one interference source (for example, terminal) and the relay station and the channel between the relay station and the reception node (for example, BS), and a second matrix, which is determined based on channel information between at least one interference source (for example, terminal) and the reception node (for example, BS). For example, beamforming matrix T may be determined by an inverse vectorization operation for the multiplication of the first matrix and the second matrix. More specifically, relay station beamforming matrix T for interference alignment for all j may be designed as equation (16) below.

$$T \stackrel{def}{=} vec^{-1}\left(\begin{bmatrix} (\overline{H}_1^{SR})^T \otimes H_1^{RD} \\ (\overline{H}_2^{SR})^T \otimes H_2^{RD} \\ (\overline{H}_3^{SR})^T \otimes H_3^{RD} \end{bmatrix}^{-1} \begin{bmatrix} vec(-\overline{H}_1) \\ vec(-\overline{H}_2) \\ vec(-\overline{H}_3) \end{bmatrix}\right) \quad \text{equation (16)}$$

In equation (16), T denotes a relay station beamforming matrix for interference alignment, $\overline{H}_j^{SR}$ denotes a channel from terminals that give interference to BS j to the relay station, $H_j^{RD}$ denotes a channel from the relay station to BS j, and $\overline{H}_j$ denotes a channel from terminals that give interference to BS j to BS j. vec(•) denotes a vectorization operator for the matrix, $vec^{-1}$(•) denotes an inverse operator of vec(•), $(\bullet)^T$ denotes a transpose matrix operator, ⊗ denotes a kronecker product operator, and $[\bullet]^{-1}$ denotes an operator for an inverse matrix and a pseudo inverse matrix.

Accordingly, beamforming matrix T is determined to make a result, which is generated by adding a channel matrix between a transmission node located near a neighbor cell and a cluster boundary (a terminal located near a neighbor cell and a cluster boundary in uplink communication) and a reception node (a BS in uplink communication) and a matrix, which is generated by multiplying a channel matrix between the relay station and a reception node (a BS of a serving cell in uplink communication), a beamforming matrix, and a channel matrix between the transmission node located near the neighbor cell and the cluster boundary and the relay station, become a zero matrix. Here, the zero matrix refers to a matrix having all values therein are 0. However, the zero matrix includes not only the matrix in which all values are necessarily physically 0, but also a matrix having values equal to or smaller than a predetermined reference value according to the purpose of interference cancelation. For example, when the reference value is 10−3, matrixes having values smaller than or equal to 10−3 may be the zero matrix.

At this time, an effective channel for a signal of cell j received by BS j is as equation (17) below.

$$\hat{H}_{effective} = \hat{H}_j + H_j^{RD} T \hat{H}_j^{SR} \quad \text{equation (17)}$$

$\hat{H}_{effective}$ denotes an effective channel for a signal of cell j received by BS j, $\hat{H}_j$ denotes a channel from terminals of cell j to BS j, $H_j^{RD}$ denotes a channel from the relay station to BS j, and $\hat{H}_j^{SR}$ denotes a channel from terminals of cell j to the relay station.

Designing of a filter for separating an intra-cell signal in the BS corresponding to the reception node is as equation (18) below.

$$U_j = (\hat{H}_{effective})^{-1} \quad \text{equation (18)}$$

In equation (18), $U_j$ denotes a filter for separating an intra-cell signal in BS j, and $\hat{H}_{effective}$ denotes an effective channel for a signal of cell j received by BS j.

In a case of N≠MK, $\hat{H}_{effective} = \hat{H}_j + H_j^{RD} T \hat{H}_j^{SR}$ is not a square matrix, so that $U_j$ may be designed as a pseudo inverse matrix. The finally acquired degrees of freedom per cell are as equation (19) below.

$$DoF_{cell} = \tfrac{1}{2}\min(KM, N) \quad \text{equation (19)}$$

$DoF_{cell}$ denotes degrees of freedom per cell, K denotes a number of terminals per cell, denotes a number of antennas per terminal, and N denotes a number of antennas per BS. At this time, an amount of required relay station antennas is as equation (20) below.

$$N_R \geq \max(5KM, 3N) \quad \text{equation (20)}$$

$N_R$ denotes a number of antennas of the relay station to achieve the perfect interference alignment, K denotes a number of terminals per cell, M denotes a number of antennas per terminal, and N denotes a number of antennas per BS. The duality principles may be applied to a downlink communication step.

The wireless communication system illustrated in FIG. 10 or FIG. 11 has been described in an assumption of a case where the number of cluster boundary terminals is 3K in consideration of a phase structure of a 3-cell cluster. However, the present disclosure is not limited to the case where the number of cluster boundary terminals is 3K, and may be applied to a general case where the number of cluster boundary terminals is larger than or smaller than 3K.

Figure 12:
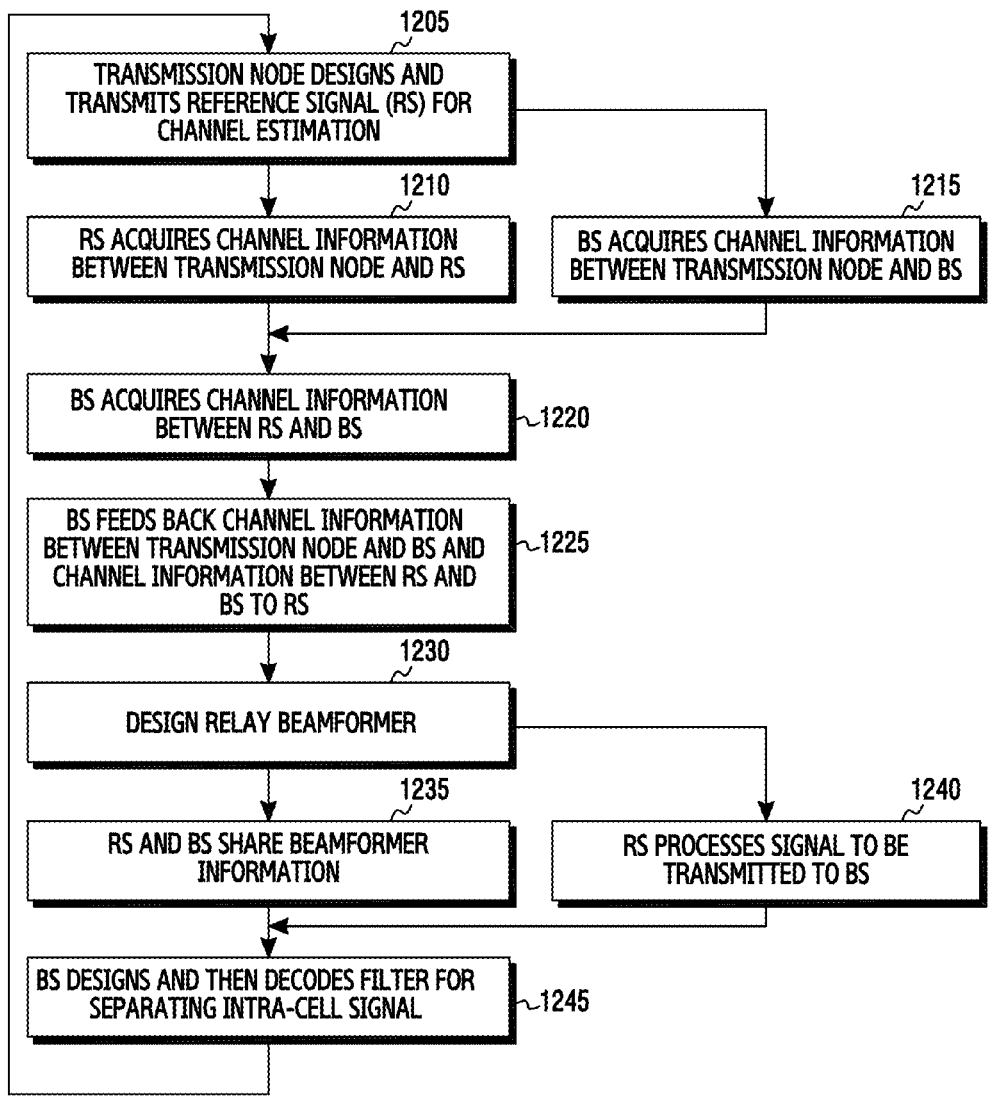
FIG. 12 illustrates a flowchart of interference alignment of uplink communication in a wireless communication system according to an embodiment of the present disclosure.

FIG. 12 illustrates a flowchart of an operation for interference alignment of uplink communication in a wireless communication system according to an embodiment of the present disclosure. In uplink communication, the transmission node corresponds to the terminal and the reception node corresponds to the BS.

In step 1205, the transmission node or the terminal designs and transmits a reference signal for channel estimation. That is, the transmission node determines a reference signal configuration and transmits at least one reference signal according to the determined configuration. The reference signal is a predetermined signal to be shared between the transmission node, the relay station, and the reception node for channel estimation, and may be referred to as a pilot signal or a sounding signal according to some embodiments.

The reference signal may be transmitted according to a predetermined period or when a particular condition is met, and may be transmitted while being inserted into any control signal or data signal.

In step 1210, the relay station may acquire information on a channel between the terminal and the relay station through the received reference signal.

Further, in step 1215, the BS may acquire information on a channel between the terminal and the BS through the received reference signal.

Steps 1210 and 1215 may be simultaneously performed as independent operations and orders of steps 1210 and 1215 may be exchanged.

In step 1220, the BS may acquire information on a channel between the relay station and the BS. According to an embodiment, the BS may acquire information on the channel between the relay station and the BS by using the reference signal received from the relay station.

In step 1225, the BS may feedback the information on the channel between the terminal and the BS acquired in step 1215 and the information on the channel between the BS and the relay station acquired in step 1220 to the relay station. The information on the channel between the terminal and the BS and the information on the channel between the BS and the relay station may be transmitted from the BS to the relay station according to a predetermined period or when a particular condition is met, and may be transmitted while being inserted into any control signal or data signal.

In step 1230, the relay station designs a relay station beamformer or a relay station beamforming matrix. The relay station beamforming matrix is designed to meet an interference alignment condition in the BS corresponding to the reception node and, more specifically, determined to remove an inter-cell interference component from a signal generated by adding a signal received in one time slot and a signal received in the following time slot.

In step 1235, the relay station and the BS share information on the beamformer. More specifically, the relay station transmits the information on the beamformer to the BS. When the predetermined period arrives or the particular condition such as a change in the beamforming matrix is met, the relay station may transmit the information on the beamformer. At this time, the relay station may transmit all data of the beamforming matrix or only an index of the beamforming matrix.

In step 1240, the relay station processes a signal to be transmitted to the BS. More specifically, the relay station applies the beamforming matrix designed in step 1230 or precoding to signals received from a plurality of terminals and generates a signal to be transmitted to the BS. A beamforming operation may be performed through a digital beamforming or Radio Frequency (RF) beamforming scheme. According to an embodiment, the relay station may decode the signal received from the terminal, perform an error correction, amplify the received signal, and transmit the signal to the BS.

The operation in step 1235 and the operation in step 1240 may be simultaneously performed as independent operations and orders of steps 1235 and 1240 may be exchanged.

In step 1245, the BS designs a filter for separating an intra-cell signal and performs a decoding. The BS may design the separation filter by using beamformer information and information on the channel between terminals of the serving cell and the relay station received from the relay station, and may omit the designing of the separation filter according to an embodiment such as a case where only one terminal exists in the serving cell.

The BS may decode the signal acquired through interference alignment. The decoding is a process of processing encoded data to be data before the encoding, and various decoding scheme may be used without restriction. For example, schemes such as a turbo coding/decoding or a low density parity check (LDPC) coding/decoding may be used.

As illustrated in FIG. 12, the same process may be repeated after step 1245.

In downlink communication, operations which are the same as the steps illustrated in FIG. 12 may be performed by duality principles, but the transmission node becomes the BS instead of the terminal and the reception node becomes the terminal instead of the BS.

In general, the terminal has a lower processing capability compared to the BS or the relay station. Accordingly, instead of designing the filter for separating the intra-cell signal by the terminal, the BS may design a transmission node transmission beamformer. In this case, the terminal corresponding to the reception node may separate the intra-cell signal without the designing of the filter for separating the signal, that is, without need to process channel information for designing the reception node filter.

Figure 13:
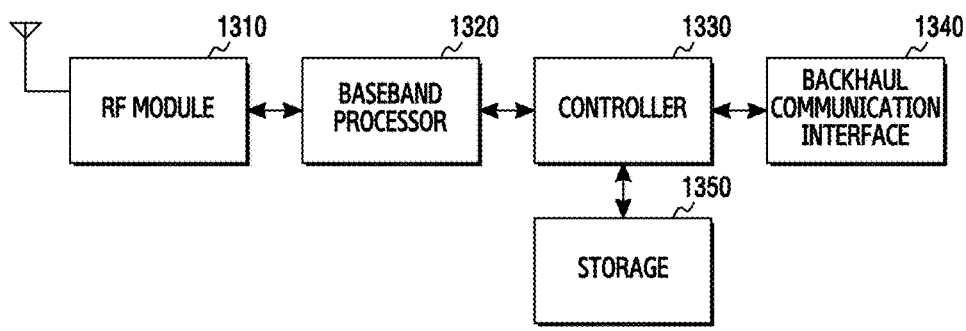
FIG. 13 illustrates an example block diagram of a function of the BS according to an embodiment of the present disclosure.

FIG. 13 illustrates a block diagram illustrating a function of the BS according to an embodiment of the present disclosure.

The term "~unit" or "~er" used hereinafter may refer to the unit for processing at least one function or operation and may be implemented in hardware, software, or a combination of hardware and software. The BS is a device that is connected to a backhaul network and provides wireless communication within a predetermined coverage area, and may be referred to as an evolved NodeB (eNB), or an access point (AP).

As illustrated in FIG. 13, the BS may include an RF module 1310, a baseband processor 1320, a controller 1330, a backhaul communication interface 1340, and a storage 1350.

The RF module 1310 performs a function of transmitting and receiving a signal through a radio channel such as converting or amplifying a band of the signal. That is, the RF module 1310 up-converts a baseband signal provided from the baseband processor 1320 into an RF band signal, transmits the RF band signal through an antenna, and then down-converts the RF band signal received through the antenna into a baseband signal. For example, the RF module 1310 may include a transmission filter, a reception filter, an amplifier, a mixer, an oscillator, a digital-to-analog converter (DAC), an analog-to-digital converter (ADC), and the like. Although only one antenna is illustrated in FIG. 13, the BS may include a plurality of antennas. In addition, the RF module 1310 may include a plurality of RF chains. Moreover, the RF module 1310 may perform beamforming. For the beamforming, the RF module 1310 may control a phase and a size of each of the signals transmitted/received through a plurality of antennas or antenna elements.

The baseband processor 1320 performs a function for a conversion between a baseband signal and a bitstream according to a physical layer standard of the system. For example, when data is transmitted, the baseband processor 1320 generates complex symbols by encoding and modulating a transmission bitstream. In addition, the baseband processor 1320, when receiving data, reconstructs a reception bitstream through a demodulation and decoding of the baseband signal provided from the RF module 1310. For example, in an Orthogonal Frequency Division Multiplexing (OFDM) scheme, when data is transmitted, the baseband processor 1320 generates complex symbols by encoding and modulating a transmission bitstream, maps the complex symbols to subcarriers, and then configures OFDM symbols through an Inverse Fast Fourier Transform (IFFT) operation and a cyclic prefix (CP) insertion. Further, when data is received, the baseband processor 1320 divides the baseband signal provided from the RF module 1310 in the unit of OFDM symbols, reconstructs the signals mapped to the subcarriers through a Fast Fourier Transform (FFT) operation, and then reconstructs the reception bitstream through demodulation and decoding. The baseband processor 1320 and the RF module 1310 transmit and receive signals as described above. Accordingly, the baseband processor 1320 and the RF module 1310 may be referred to as a transmitter, a receiver, a transceiver, a communication interface, or a wireless communication interface.

When the BS corresponds to the reception node, the baseband processor 1320 of the BS, the RF module 1310, or the transceiver may receive first signals including a signal received through a first channel, which is a channel between at least one terminal belonging to a serving cell of the BS and the BS, and a signal received through a second channel, which is a channel between at least one terminal belonging to a cell of a neighbor BS and the BS, in a first time slot. Further, the transceiver of the BS may receive second signals, to which a beamforming matrix is applied, from the relay station. Here, the second signals may include a signal generated by applying the beamforming matrix to a signal received through a third channel, which is a channel between the terminal belonging to the serving cell of the BS and the relay station, and a signal generated by applying the beamforming matrix to a signal received through a fourth channel, which is a channel between the terminal belonging to the neighbor BS and the relay station. Further, the transceiver of the BS may transmit information on a fifth channel, which is a channel between the relay station and the BS, and information on the second channel, which is the channel between the terminal belonging to the cell of the neighbor BS and the BS, to the relay station. In addition, the transceiver of the BS may receive information on the beamforming matrix and information on the third channel, which is the channel between the terminal belonging to the serving cell and the relay station from the relay station, and the information on the beamforming matrix may be used for the filter for separating the inter-cell signal by the BS corresponding to the reception node in uplink communication or the transmission beamforming of the BS corresponding to the transmission node in downlink communication.

Further, the transceiver may remove intra-cell interference by applying the filter to the signal received using one or more pieces of channel information in uplink communication, and may transmit a transmitted/received signal, to which beamforming is applied, to the terminal or the relay station in downlink communication. More specifically, in uplink communication, the transceiver may apply a filter matrix to a vector for the received signal, transfer a vector generated through the application of the filter matrix to the controller 1330, and decode the received signal. More specifically, in downlink communication, the transceiver may apply a beamforming matrix or a precoding matrix to a vector for a signal to be transmitted, convert a vector generated through the application of the beamforming matrix into an RF signal, and transmit the RF signal.

The controller 1330 controls general operations of the BS. For example, the controller 1330 transmits and receives signals through the baseband processor 1320 and the RF module 1310 or the backhaul communication interface 1340. Further, the controller 1330 records data in the storage 1350 and reads the recorded data. To this end, the controller 1330 may include at least one processor. According to an embodiment of the present disclosure, the controller 1330 may design a beamforming matrix by using received channel information. For example, the controller 1330 may control the BS to perform the process illustrated in FIG. 7. The operation of the controller 1330, according to an embodiment of the present described, is described below.

According to some embodiments, the controller 1330 may estimate the channel by using the reference signal received from the terminal or the relay station. Information on the channel acquired through the channel estimation may be transmitted to the relay station and shared with the relay station.

According to some embodiments, the controller 1330 may decode the signal received by the BS. Specifically, the controller 1330 may decode the signal acquired through interference alignment. The decoding corresponds to a process of processing encoded data to be data before the encoding, and various decoding schemes may be used. For example, schemes such as a turbo coding/decoding, low density parity check (LDPC) code/decoding may be used, and at least one processing device may be included to perform the decoding.

According to some embodiments, the controller 1330 may design the filter or the transmission beamformer to separate the inter-cell signal. The filter or the transmission beamformer may be determined based on information on the beamforming matrix and channel information received from the relay station.

The backhaul communication interface 1340 provides an interface for performing communication with other nodes within the network. That is, the backhaul communication interface 1340 converts a bitstream transmitted to another node, for example, another BS or a core network from the BS into a physical signal and converts the physical signal received from the other node into the bitstream. According to various embodiments, the BS may exchange the channel information or a precoding matrix by communicating with the neighbor BS through the backhaul communication interface 1340 and, when the BS is connected to the relay station through a backhaul network, exchange the channel information and the precoding matrix with the relay station.

The storage 1350 stores data such as a basic program, an application program, and setting information for the operation of the BS. Particularly, the storage 1350 provides stored data according to a request of the controller 1330.

Figure 14:
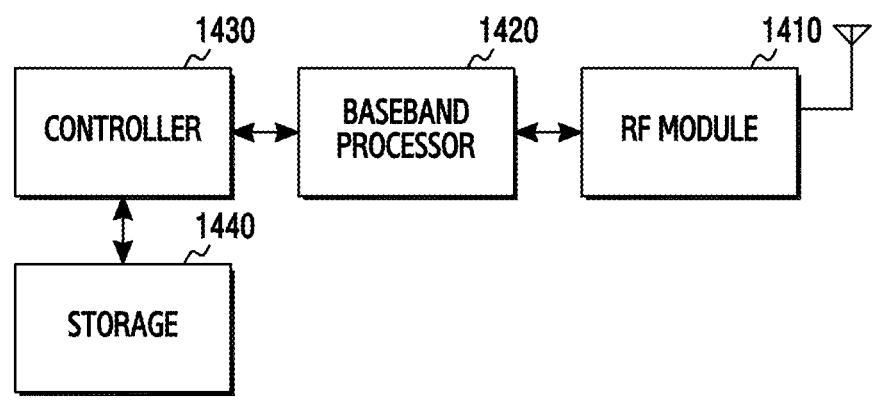
FIG. 14 illustrates an example block diagram of a function of the relay station according to an embodiment of the present disclosure.

FIG. 14 illustrates an example block diagram of a function of the relay station according to an embodiment of the present disclosure.

The relay station is a device that provides relay communication between the BS and the terminal and may be called a Relay Station (RS) or a relay according to some embodiments.

Referring to FIG. 14, the relay station includes an RF module 1410, a baseband processor 1420, a controller 1430, and a storage 1440.

The RF module 1410 performs a function for transmitting and receiving a signal through a wireless channel, such as band conversion and amplification of a signal. That is, the RF module 1410 up-converts a baseband signal provided from the baseband processor 1420 into an RF band signal, transmits the RF band signal through an antenna, and then down-converts the RF band signal received through the antenna into a baseband signal. For example, the RF module 1410 may include a transmission filter, a reception filter, an amplifier, a mixer, an oscillator, a DAC, and an ADC. Although only one antenna is illustrated in FIG. 14, the relay station may include a plurality of antennas. In addition, the RF module 1410 may include a plurality of RF chains. Moreover, the RF module 1410 may perform beamforming. For the beamforming, the RF module 1410 may control a phase and a size of each of the signals transmitted and received through a plurality of antennas or antenna elements.

The baseband processor 1420 performs a function for a conversion between a baseband signal and a bitstream according to a physical layer standard of the system. For example, the baseband processor 1420, when transmitting data, generates complex symbols by encoding and modulating a transmission bitstream. In addition, the baseband processor 1420, when receiving data, reconstructs the reception bitstream through the demodulation and decoding of the baseband signal provided from the RF module 1410. For example, in an OFDM scheme, when transmitting data, the baseband processor 1420 may generate complex symbols by encoding and modulating the transmission bitstream, map the complex symbols to subcarriers, and then configure OFDM symbols through an IFFT operation and CP insertion. Further, when receiving data, the baseband processor 1420 divides the baseband signal provided from the RF module 1410 in the unit of OFDM symbols, reconstructs the signals mapped to the subcarriers through a FFT operation, and then reconstructs the reception bitstream through demodulation and decoding.

The baseband processor 1420 and the RF module 1410 transmit and receive signals as described above. Accordingly, the baseband processor 1420 and the RF module 1410 may be referred to as a transmitter, a receiver, a transceiver, or a communication interface, and the transceiver of the relay station may perform a function similar to that of the transceiver of the BS. Further, at least one of the baseband processor 1420 and the RF module 1410 may include a plurality of communication modules to support a plurality of different communication standards. In addition, at least one of the baseband processor 1420 and the RF module 1410 may include different communication modules to process signals of different frequency bands. For example, the different communication standards may include a wireless LAN (for example, IEEE 802.11) and a cellular network (for example, LTE). Further, the different frequency bands may include a super high frequency (SHF) (for example, 2.5 GHz and 5 GHz) band and a millimeter (mm) wave (for example, 60 GHz) band.

The controller 1430 controls general operations of the relay station. For example, the controller 1430 transmits and receives a signal through the baseband processor 1420 and the RF module 1410. In addition, the controller 1430 may record data in the storage 1440 and read the data. To this end, the controller 1430 may include at least one processor. For example, the controller 1430 may include a communication processor (CP) that performs a control for communication, and an application processor (AP) that controls a higher layer such as an application program.

The storage 1440 stores data, such as a basic program, an application program, and setting information for the operation of the relay station. Particularly, the storage 1440 may provide the stored data according to a request of the controller 1430.

According to some embodiments, the transceiver or the controller 1430 of the relay station may include an amplifier, or may include a decoder for performing amplify and forward (AF) function or a decode and forward (DF) function. Further, according to some embodiments, the transceiver or the controller 1430 of the relay station may include a device for performing a full-duplex mode relay and a half-duplex mode relay. The operation of the relay station including the controller 1430 and the transceiver is described below.

According to an embodiment, the transceiver of the relay station receives first signals from a plurality of transmission nodes in a first time slot and transmits second signals generated by applying a beamforming matrix to the first signals, to the reception node in a second time slot. The beamforming matrix is designed or determined by the controller 1430 and determined to remove an interference component from a signal generated by adding the signal received in the first time slot and the signal received in the second time slot by the reception node.

In uplink communication, the transmission node corresponds to the terminal and the reception node corresponds to the BS. The first signals include a signal received through a channel between a terminal belonging to a serving cell of the BS and the BS and a signal received through a channel between a terminal belonging to a cell of a neighbor BS and the BS, and the second signals include a signal generated by applying the beamforming matrix to a signal received through a channel between the terminal belonging to the serving cell of the BS and the relay station and a signal generated by applying the beamforming matrix to a signal received through a channel between a terminal belonging to a cell of another BS and the relay station. Further, the transceiver may receive, from the BS, information on the channel between the terminal belonging to the serving cell of the BS and the BS and the channel between the terminal belonging to the cell of the neighbor BS and the BS and information on the channel between the relay station and the BS. The beamforming matrix may be determined based on the acquired channel information, for example, information on the channel between the terminal belonging to the cell of the neighbor BS and the BS, the channel between the terminal belonging to the cell of the neighbor BS and the relay station, and the channel between the relay station and the BS by the controller 1430 of the relay station. The beamforming matrix may be designed to remove a signal received in a cell other than the serving cell of the BS, that is, an inter-cell interference signal from the signal received by the BS corresponding to the reception node.

In downlink communication, the reception node corresponds to the terminal and the transmission node corresponds to the BS. In this case, the first signals include a signal received through a channel between the serving BS and the terminal and a signal received through a channel between the neighbor BS and the terminal, and the second signals include a signal generated by applying a beamforming matrix to a signal received through a channel between the serving BS and the relay station and a signal generated by applying the beamforming matrix to a signal received through a channel between the neighbor BS and the relay station. The beamforming matrix may be determined based on the channel information, for example, based on information on the channel between the terminal and the neighbor BS, the channel between the neighbor BS and the relay station, and the channel between the relay station and the terminal by the controller 1430, and is determined to remove a signal received from the neighbor BS in the terminal corresponding to the reception node. Further, the transceiver may transmit information on the beamforming matrix and the information on the channel between the terminal of the serving cell and the relay station to the BS, and the information is used for transmission beamforming to separate an intra-cell signal in the BS.

Figure 15:
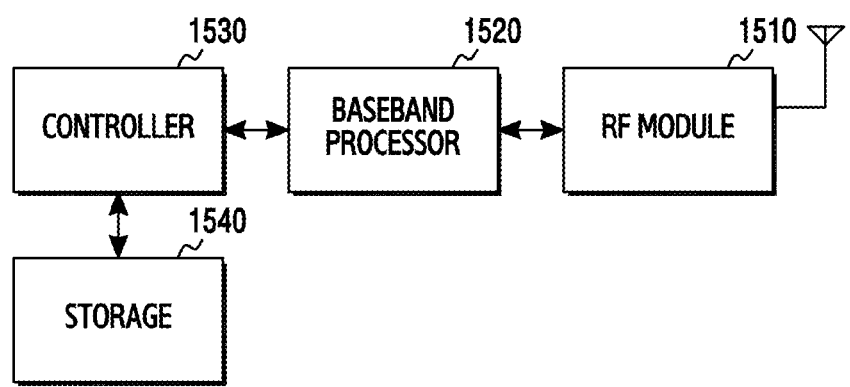
FIG. 15 illustrates an example block diagram of a function of the terminal according to an embodiment of the present disclosure.

FIG. 15 illustrates an example block diagram of a function of a terminal apparatus according to an embodiment of the present disclosure.

According to an embodiment, the terminal may be referred to as a user device, an electronic device, a mobile station, a user equipment (UE), a mobile station (MS), station (STA), or the like.

According to various embodiments, the terminal may be a portable electronic device, or may be one of a smart phone, a portable terminal, a mobile phone, a mobile pad, a media player, a tablet computer, a handheld computer, and a personal digital assistant (PDA). Further, the terminal may be a device generated through a combination of two or more functions of the above devices.

Referring to FIG. 15, the terminal includes an RF module 1510, a baseband processor 1520, a controller 1530, and a storage 1540.

The RF module 1510 performs a function for transmitting and receiving a signal through a wireless channel, such as band conversion and amplification of a signal. That is, the RF module 1510 up-converts a baseband signal provided from the baseband processor 1520 into an RF band signal, transmits the RF band signal through an antenna, and then down-converts the RF band signal received through the antenna into a baseband signal. For example, the RF module 1510 may include a transmission filter, a reception filter, an amplifier, a mixer, an oscillator, a DAC, and an ADC. Although only one antenna is illustrated in FIG. 15, the terminal may include a plurality of antennas. In addition, the RF module 1510 may include a plurality of RF chains. Moreover, the RF module 1510 may perform beamforming. For the beamforming, the RF module 1510 may control a phase and a size of each of the signals transmitted and received through a plurality of antennas or antenna elements.

The baseband processor 1520 performs a function for a conversion between a baseband signal and a bitstream according to a physical layer standard of the system. For example, the baseband processor 1520, when transmitting data, generates complex symbols by encoding and modulating a transmission bitstream. In addition, the baseband processor 1520, when receiving data, reconstructs the reception bitstream through the demodulation and decoding of the baseband signal provided from the RF module 1510. For example, in an OFDM scheme, when transmitting data, the baseband processor 1520 may generate complex symbols by encoding and modulating the transmission bitstream, map the complex symbols to subcarriers, and then configure OFDM symbols through an IFFT operation and CP insertion. Further, when receiving data, the baseband processor 1520 divides the baseband signal provided from the RF module 1510 in the unit of OFDM symbols, reconstructs the signals mapped to the subcarriers through a FFT operation, and then reconstructs the reception bitstream through demodulation and decoding.

The baseband processor 1520 and the RF module 1510 transmit and receive signals as described above. Accordingly, the baseband processor 1520 and the RF module 1510 may be referred to as a transmitter, a receiver, a transceiver, or a communication interface. Further, at least one of the baseband processor 1520 and the RF module 1510 may include a plurality of communication modules to support a plurality of different communication standards. In addition, at least one of the baseband processor 1520 and the RF module 1510 may include different communication modules to process signals of different frequency bands. For example, the different communication standards may include a wireless LAN (for example, IEEE 802.11) and a cellular network (for example, LTE). Further, the different frequency bands may include a SHF (for example, 2.5 GHz or 5 GHz) band and a mm wave (for example, 60 GHz) band.

The controller 1530 controls general operations of the terminal. For example, the controller 1530 transmits and receives a signal through the baseband processor 1520 and the RF module 1510. In addition, the controller 1530 may record data in the storage 1540 and read the data. To this end, the controller 1530 may include at least one processor. For example, the controller 1530 may include a CP for controlling communication and an AP for controlling a higher layer such as an application program. According to an embodiment of the present disclosure, the controller 1530 may control the operation of the terminal according to various embodiments. For example, the controller 1530 may control the terminal to perform the process illustrated in FIG. 9. The operation of the terminal including the controller 1530 and the transceiver is described below.

In downlink communication, the transceiver of the terminal receives first signals from a plurality of BSs and in a first time slot and receives second signals, to which a beamforming matrix is applied, from the relay station in a second time slot. The controller 1530 of the terminal decodes a third signal acquired by adding the first signal and the second signal. Here, the beamforming matrix is determined to remove an interference component from the third signal by the controller 1530 of the relay station.

For example, the first signals received by the transceiver in the first time slot include a signal received through a channel between the terminal and a serving BS of the terminal and a signal received through a channel between the terminal and a neighbor BS, and the second signals include a signal generated by applying the beamforming matrix to a signal received through a channel between the serving BS and the relay station and a signal generated by applying the beamforming matrix to a signal received through a channel between the neighbor BS and the relay station. The beamforming matrix is determined based on channel information and, more particularly, information on the channel between the terminal and the neighbor BS, the channel between the neighbor BS and the relay station, and the channel between the relay station and the terminal, and is determined to remove an interference signal received from a neighbor BS, which is not the serving BS of the terminal.

The transceiver of the terminal may receive a reference signal for channel estimation from the BS, and the transceiver or the controller 1530 may perform the channel estimation between the BS and the terminal by using the received reference signal. For example, the terminal may acquire information on the channel between the terminal and the serving BS from the reference signal received from the serving BS and acquire information on the channel between the terminal and the neighbor BS from the reference signal received from the neighbor BS. Further, the transceiver of the terminal may receive the reference signal from the relay station, and the transceiver or the controller 1530 may acquire information on the channel between the terminal and the BS from the received reference signal.

The transceiver of the terminal may transmit the acquired channel information to the BS or the relay station. For example, the terminal may feedback the information on the channel between the neighbor BS and the terminal and the information on the channel between the relay station and the terminal from the reference signal received from the neighbor BS and the relay station to the relay station, and may feedback the information on the channel between the serving BS and the terminal and the information on the channel between the relay station and the terminal to the serving BS to allow the information to be used for designing the transmission beamformer. According to embodiments of the present disclosure, the terminal does not receive the channel information since the terminal is not required to process the channel information. However, in some wireless communication systems, when the terminal requires the channel information or the terminal has an enough capability to process the channel information, the terminal may exchange the channel information with the BS or the relay station.

The storage 1540 stores data such as a basic program, an application program, and setting information for the operation of the terminal. Particularly, the storage 1540 may provide the stored data according to a request of the controller 1530. For example, the storage 1540 may store channel information acquired through the channel estimation or channel information received from the BS or the relay station.

The present disclosure can solve an interference problem that may be necessarily generated in a state where the density of a cell, such as a heterogeneous network or femtocell as well as a simple cellular network, increases. Through the application of embodiments of the present disclosure, it is possible to acquire a multi-cell gain and to more increase a transmission rate compared to the currently used scheme.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The software may be stored in the form of a volatile or a non-volatile storage device such as a read only memory (ROM), a memory such as a random access memory (RAM), memory chips, devices or integrated circuits, or an optical or magnetic readable medium such as a compact disc-ROM (CD-ROM), digital versatile discs (DVDs), a magnetic disk, or a magnetic tape.

A storage device and a storage medium corresponds to embodiments of a program including instructions for performing embodiments or a machine-readable storage means suitable for storing programs when executed. Embodiments provide a program including a code for implementing the device or the method claimed in one of the claims of the specification and a machine-readable storage medium for storing the program. Further, the programs may be electrically transferred to a medium, such as a communication signal transferred through a wired or a wireless connection, and embodiments properly include the equivalents.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operation method of a reception node in a wireless communication system, the operation method comprising:
receiving a first signal including a first channel signal received through a first channel between at least one transmission node belonging to a cell of the reception node and the reception node, and a second channel signal received through a second channel between at least one transmission node belonging to a neighbor cell and the reception node during a first time interval;

receiving a second signal, to which beamforming for removing a signal from at least one transmission node belonging to the neighbor cell is applied, from a relay station through a channel between the relay station and the reception node during a second time interval; and decoding a third signal acquired by adding the first signal and the second signal.

2. The operation method of claim 1, wherein the second signal includes a signal that is generated by applying the beamforming to a third channel signal received through a third channel corresponding to a channel between the at least one transmission node belonging to the cell and the relay station, and a fourth channel signal received through a fourth channel corresponding to a channel between at least one transmission node belonging to the neighbor cell and the relay station.

3. The operation method of claim 2, wherein a beamforming matrix is determined based on information on the second channel, the fourth channel, and a fifth channel corresponding to a channel between the relay station and the reception node.

4. The operation method of claim 3, wherein the beamforming matrix is determined to make a result that is generated by adding a matrix for the second channel and a matrix that is generated by multiplying a matrix for the fifth channel, a beamforming channel, and a matrix for the fourth channel, the matrix being became a zero matrix.

5. The operation method of claim 3, further comprising:
acquiring information on the first channel and the second channel from at least one reference signal received from the at least one transmission node;
receiving information on the third channel and the fourth channel from the relay station; and
acquiring information on the fifth channel from a reference signal received from the relay station.

6. The operation method of claim 5, further comprising transmitting the information on the second channel and the information on the fifth channel to the relay station.

7. The operation method of claim 1, wherein the decoding of the third signal acquired by adding the first signal and the second signal comprises:
applying a filter for separating an intra-cell signal from the third signal to the third signal; and
decoding the third signal to which the filter is applied,
wherein the method further comprising receiving information on a beamforming matrix and a third channel from the relay station, and wherein the filter is determined based on the information on the beamforming matrix, the first channel, the third channel, and a fifth channel.

8. An apparatus of a reception node in a wireless communication system, the apparatus comprising:
a transceiver configured to:
receive a first signal including a first channel signal received through a first channel between at least one transmission node belonging to a cell of the reception node and the reception node, and a second channel signal received through a second channel between at least one transmission node belonging to a neighbor cell and the reception node during a first time interval; and
receive a second signal, to which beamforming for removing a signal from at least one transmission node belonging to the neighbor cell is applied, from a relay station through a channel between the relay station and the reception node; and
a controller configured to decode a third signal acquired by adding the first signal and the second signal.

9. The apparatus of claim 8, wherein the second signal includes a signal that is generated by applying the beamforming to a third channel signal received through a third channel corresponding to a channel between the at least one transmission node belonging to the cell and the relay station, and a fourth channel signal received through a fourth channel corresponding to a channel between at least one transmission node belonging to the neighbor cell and the relay station.

10. The apparatus of claim 9, wherein a beamforming matrix is determined based on information on the second channel, the fourth channel, and a fifth channel corresponding to a channel between the relay station and the reception node.

11. The apparatus of claim 10, wherein the beamforming matrix is determined to make a result that is generated by adding a matrix for the second channel and a matrix that is generated by multiplying a matrix for the fifth channel, a beamforming channel, and a matrix for the fourth channel, the matrix being became a zero matrix.

12. The apparatus of claim 10, wherein the controller is further configured to:
acquire information on the first channel and the second channel from at least one reference signal received from the at least one transmission node;
receive information on the third channel and the fourth channel from the relay station; and
acquire information on the fifth channel from a reference signal received from the relay station.

13. The apparatus of claim 12, wherein the transceiver is further configured to transmit the information on the second channel and the information on the fifth channel to the relay station.

14. The apparatus of claim 8, wherein:
the controller is further configured to apply a filter for separating an intra-cell signal from the third signal to the third signal and decodes the third signal to which the filter is applied; and
the transceiver is further configured to receive information on a beamforming matrix and a third channel from the relay station, and wherein the filter is determined based on the information on the beamforming matrix, the first channel, the third channel, and a fifth channel.

15. An apparatus of a relay station in a wireless communication system, the apparatus comprising:
a transceiver configured to:
receive a first signal including a first channel signal received through a first channel between at least one transmission node belonging to a cell of a reception node and the relay station, and a second channel signal received through a second channel between at least one transmission node belonging to a neighbor cell and the relay station during a first time interval;
transmit a second signal, to which beamforming for removing a signal from at least one transmission node belonging to the neighbor cell received by the reception node is applied, to the reception node through a channel between the relay station and the reception node during a second time interval; and
decoding a third signal acquired by adding the first signal and the second signal.

16. The apparatus of claim 15, wherein the second signal includes a signal that is generated by applying a beamforming matrix to the signal received through the first channel, and a signal that is generated by applying the beamforming matrix to the signal received through the second channel.

17. The apparatus of claim 16, wherein the transceiver is further configured to receive information on a channel between at least one transmission node belonging to the neighbor cell and the reception node, and a channel between the relay station and the reception node from the reception node.

18. The apparatus of claim 16, wherein the beamforming matrix is determined based on information on the second channel, a channel between at least one transmission node belonging to the cell and the relay station, and a channel between the relay station and the reception node.

19. The apparatus of claim 16, wherein the beamforming matrix is determined to make a result that is generated by adding a matrix for the second channel and a matrix that is generated by multiplying a matrix for the channel between the relay station and the reception node, the beamforming matrix, and a matrix for the channel between at least one transmission node belonging to the neighbor cell and the relay station, the matrix being became a zero matrix.

20. The apparatus of claim 15, wherein the transceiver is further configured to transmit information on a beamforming matrix and the first channel to the reception node.

* * * * *